(12) United States Patent
Endo et al.

(10) Patent No.: US 6,881,165 B2
(45) Date of Patent: Apr. 19, 2005

(54) HYDRAULIC CONTROL APPARATUS OF VEHICLE AND CONTROL METHOD

(75) Inventors: Hiroatsu Endo, Toyota (JP); Tatsuya Ozeki, Nissin (JP); Akira Kasamatsu, Toyota (JP); Nobuyuki Nagashima, Toyota (JP); Mitsuhiro Umeyama, Okazaki (JP); Hisanori Nomoto, Toyota (JP); Yuji Iwase, Susono (JP); Akira Murakami, Susono (JP); Mitsuhiro Nada, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 116 days.

(21) Appl. No.: 10/059,247

(22) Filed: Jan. 31, 2002

(65) Prior Publication Data

US 2002/0105225 A1 Aug. 8, 2002

(30) Foreign Application Priority Data

Feb. 7, 2001 (JP) .................................... 2001-030890
May 18, 2001 (JP) .................................... 2001-149358

(51) Int. Cl.⁷ .............................................. F16D 39/00
(52) U.S. Cl. ...................................... 474/28; 417/350
(58) Field of Search ............................ 417/423.5, 397, 417/350; 91/492; 310/68 R, 71, 68 A; 474/8, 28, 69

(56) References Cited

U.S. PATENT DOCUMENTS

| 5,081,837 A | * | 1/1992 | Ueno .......................... 60/421 |
| 5,778,693 A | * | 7/1998 | Mientus ....................... 62/181 |
| 5,951,421 A | * | 9/1999 | D'Herripon .................. 474/28 |
| 6,170,587 B1 | * | 1/2001 | Bullock ..................... 180/69.6 |
| 6,176,083 B1 | * | 1/2001 | Ikari ........................... 60/422 |

FOREIGN PATENT DOCUMENTS

| JP | 57-097942 A | 6/1982 |
| JP | 61-21676 | 2/1986 |
| JP | 64-005178 B2 | 1/1989 |
| JP | 1-114477 | 8/1989 |
| JP | 4-45095 | 4/1992 |
| JP | 5-009515 Y2 | 3/1993 |
| JP | 6-017656 Y2 | 5/1994 |
| JP | 8-98464 | 4/1996 |
| JP | 11-3409 | 1/1999 |
| JP | 2000-018377 A | 1/2000 |
| JP | 2000-027992 A | 1/2000 |

* cited by examiner

Primary Examiner—David A. Bucci
Assistant Examiner—Vicky A. Johnson
(74) Attorney, Agent, or Firm—Oliff & Berridge, PLC

(57) ABSTRACT

A first hydraulic pump and a second hydraulic pump are respectively mounted to both ends of a rotary shaft in an electric motor, whereby it is possible to drive both of the first hydraulic pump and the second hydraulic pump by one electric motor. Since the electric motor is driven and controlled so as to have any higher rotational speed among a rotational speed of the first hydraulic pump for obtaining an amount of working fluid required in a hydraulic control circuit for a power steering apparatus and a rotational speed of the second hydraulic pump for obtaining an amount of working fluid required in a hydraulic control circuit for a power train by a hydraulic pump drive controlling portion, it is possible to necessarily and sufficiently secure the working fluids respectively required in the power steering hydraulic control circuit and the power train hydraulic control circuit which are independent from each other, by a little electric power consumption.

19 Claims, 14 Drawing Sheets

FIG. 6

| RANGE | MODE | ENGAGEMENT ELEMENT | C1 | C2 | B1 |
|---|---|---|---|---|---|
| B, D | ETC MODE | | × | ○ | × |
| B, D | DIRECT CONNECTION MODE | | ○ | ○ | × |
| B, D | MOTOR TRAVELING MODE (FORWARD MOVEMENT) | | ○ | × | × |
| N, P | NEUTRAL | | × | × | × |
| N, P | ELECTRIC CHARGE, ENGINE START | | × | × | ○ |
| R | MOTOR TRAVELING MODE (BACKWARD MOVEMENT) | | ○ | × | × |
| R | FRICTION TRAVELING MODE | | ○ | × | ○ |

HYDRAULIC CONTROL APPARATUS OF VEHICLE AND CONTROL METHOD

INCORPORATION BY REFERENCE

The disclosure of Japanese Patent Application No. 2001-030890 filed on Feb. 7, 2001 and No. 2001-149358 filed on May 18, 2001, including the specification, drawings and abstract is incorporated herein by reference in its entirety.

BACKGROUND OF THE INVENTION

1. Field of the Invention

The present invention relates to a hydraulic control apparatus of an automatic transmission for a vehicle, and more particularly to a control technique of a motor driving type hydraulic pump constituting a hydraulic power source.

2. Description of the Related Art

As a related art, there has been known an automatic transmission for a vehicle provided with respective hydraulic actuators for switching a shift transmission, driving a lock-up mechanism, circulating to an oil cooler and the like. Further, the automatic transmission for the vehicle is provided with a hydraulic control apparatus for controlling the hydraulic actuators. There is a case that a so-called electric motor-driven type hydraulic pump in which the hydraulic pump functioning as a hydraulic power source of the hydraulic control apparatus is driven, for example, by an electric motor is used. A rotational speed of the electric motor-driven type hydraulic pump is determined to a required minimum level by being controlled by the hydraulic control apparatus with taking a required hydraulic pressure, a required flow amount including a leak amount, a pump efficiency and the like into consideration. Further, an electric power consumption and a noise of the electric motor is set to a required minimum level.

For example, in the hydraulic control apparatus described in Japanese Unexamined Patent Publication No. 2000-27992, there is shown a matter that a first pump for supplying a shift transmission control flow amount and an oil pump for supplying an oil cooler circulating flow amount are driven by the same motor. In particular, in this system, a flow amount supply corresponding to the requirement is achieved by controlling the motor rotational speed, so that the pump with the greater flow amount in two pumps can be always supplied. In accordance with this structure, there is an advantage that an oil pressure can be necessarily and sufficiently generated in an electrically driven vehicle, a hybrid car or the like traveling by a motor functioning as a prime mover.

SUMMARY OF THE INVENTION

However, in Japanese Unexamined Patent Publication No. 2000-27992 mentioned above, the control technique in the case of rotating a first hydraulic pump pressure feeding a working fluid required for a power steering apparatus, and a second hydraulic pump pressure feeding a working fluid required for a hydraulic control circuit executing a shift transmission control of the automatic transmission by a common electric motor is not disclosed. Further, it is not possible to necessarily and sufficiently secure a hydraulic pressure of the working fluid required for the power steering apparatus and an amount of the working fluid required for the hydraulic control circuit executing the shift transmission control of the automatic transmission on the basis of a little electric power consumption.

The present invention is provided on the basis of the matters mentioned above, and an object thereof is to provide a hydraulic control apparatus of an automatic transmission for a vehicle, which can necessarily and sufficiently secure working fluids respectively required in a hydraulic control circuit for a power steering and a hydraulic control circuit for a shift transmission control being independent from each other in accordance with a little energy consumption.

A hydraulic control apparatus of an automatic transmission for a vehicle corresponding to one aspect of the present invention is provided with a first hydraulic pump for pressure feeding a working fluid for a power steering apparatus, a second hydraulic pump for pressure feeding a working fluid for a shift transmission control of an automatic transmission, and one motor for driving the first hydraulic pump and the second hydraulic pump.

Further, in a control method of a hydraulic control apparatus of an automatic transmission for a vehicle corresponding to one aspect of the present invention, a motor is driven and controlled so as to have a higher rotational speed between a rotational speed of a first hydraulic pump for obtaining an amount of working fluid required in a power steering apparatus and a rotational speed of a second hydraulic pump for obtaining an amount of working fluid required for a shift transmission control of the automatic transmission.

In accordance with this structure, since it is possible to drive the first hydraulic pump for the power steering and the second hydraulic pump for the shift transmission control by one motor, the number of the parts is reduced in comparison with the case of using the independent driving motors, so that it is possible to intend to lighten the system as a whole, reduce the cost thereof and save the electric power consumption.

Further, since the motor is driven and controlled so as to have the higher rotational speed between the rotational speed of the first hydraulic pump for obtaining the amount of working fluid required in the power steering apparatus and the rotational speed of the second hydraulic pump for obtaining the amount of working fluid required for the shift transmission control of the automatic transmission, it is possible to necessarily and sufficiently secure the working fluids respectively required in the power steering apparatus and the shift transmission control which correspond to the hydraulic control circuits being independent from each other.

BRIEF DESCRIPTION OF THE DRAWINGS

Next, a description will be given of the present invention with reference to the following drawings. In this case, reference numerals in the drawings denote numbers of members.

FIG. 6 is a view describing a corresponding relation between a traveling mode of the vehicle in FIG. 1 and an operation of a hydraulic type frictional engagement apparatus provided in the hydraulic control apparatus;

DESCRIPTION OF THE PREFERRED EMBODIMENT

A description will be in detail given below of an embodiment corresponding to one aspect of the present invention with reference to the accompanying drawings.

Figure 1:
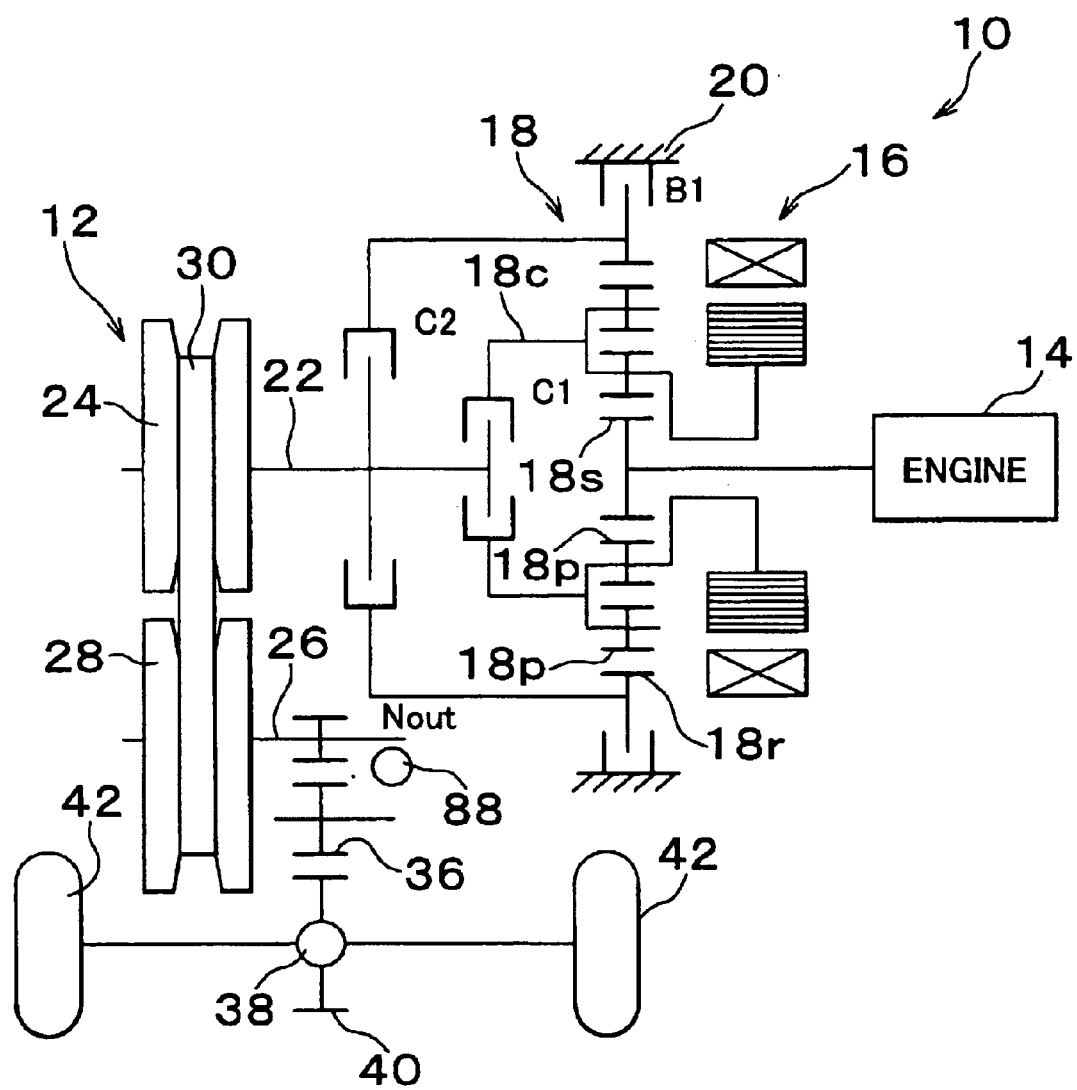
FIG. 1 is a skeleton view schematically describing a structure of a power transmission apparatus for a vehicle to which a hydraulic control apparatus of an automatic transmission for a vehicle in accordance with one embodiment of the present invention is applied.

FIG. 1 is a skeleton view schematically showing a structure of a drive apparatus for a vehicle provided with a hydraulic control apparatus of an automatic transmission in accordance with one embodiment of the present invention, that is, a power transmission apparatus 10. The power transmission apparatus 10 corresponds to a power transmission apparatus for a so-called hybrid vehicle. The power transmission apparatus 10 is constituted by an engine 14 such as an internal combustion engine or the like generating a power on the basis of a combustion of a fuel, a motor generator 16 used as an electric motor and a power generator, a double pinion type planetary gear apparatus 18 and an automatic transmission 12. The power transmission apparatus 10 is horizontally mounted on a front engine front drive (FF) vehicle or the like so as to be used. An engine 14 is connected to a sun gear 18s of the planetary gear apparatus 18, and a motor generator 16 is connected to a carrier 18c. Further, a ring gear 18r of the planetary gear 18 is connected to a fixed case (transmission housing) 20 via a first brake B1. Further, a carrier 18c rotatably supporting a pair of pinions (planetary gears) 18p engaged with each other and engaged with the ring gear 18r and the sun gear 18s is connected to an input shaft 22 of the automatic transmission 12 via the first clutch C1. The ring gear 18r is connected to the input shaft 22 via the second clutch C2. The engine 14 and the motor generator 16 correspond to a prime mover of the vehicle. The motor generator 16 and the planetary gear apparatus 18 correspond to a gear type power combining and distributing apparatus or an electric torque converter. The sun gear 18s corresponds to a first rotational element, the carrier 18c corresponds to a second rotational element and the ring gear 18r corresponds to a third rotational element, respectively.

In the present embodiment, the automatic transmission 12 is a belt type continuously variable transmission. The automatic transmission 12 is provided with an input side variable pulley 24, an output side variable pulley 28 and a transmission belt 30. The input side variable pulley 24 is provided in an input shaft 22, and an effective diameter is variable. The output side variable pulley 28 is provided in an output shaft 26, and an effective diameter is variable. The transmission belt 30 is wound around the input side variable pulley 24 and the output side variable pulley 28. The effective diameter of the input side variable pulley 24 is changed by a hydraulic actuator for a shift transmission (not shown), whereby a transmission gear ratio ν (=input shaft rotational speed $N_{IN}$/output shaft rotational speed $N_{OUT}$) of the automatic transmission 12 is controlled. Further, the effective diameter of the output side variable pulley 28 is changed by a hydraulic actuator for a tension control (not shown), whereby a tension, that is, a gripping force of the transmission belt 30 is necessarily and sufficiently controlled. Further, a power is transmitted to a large diameter gear 40 of a differential gear apparatus 38 from the output shaft 26 via a counter gear 36. A power is distributed to right and left drive wheels (front wheels in the present embodiment) 42 by the differential gear apparatus 38.

Figure 2:
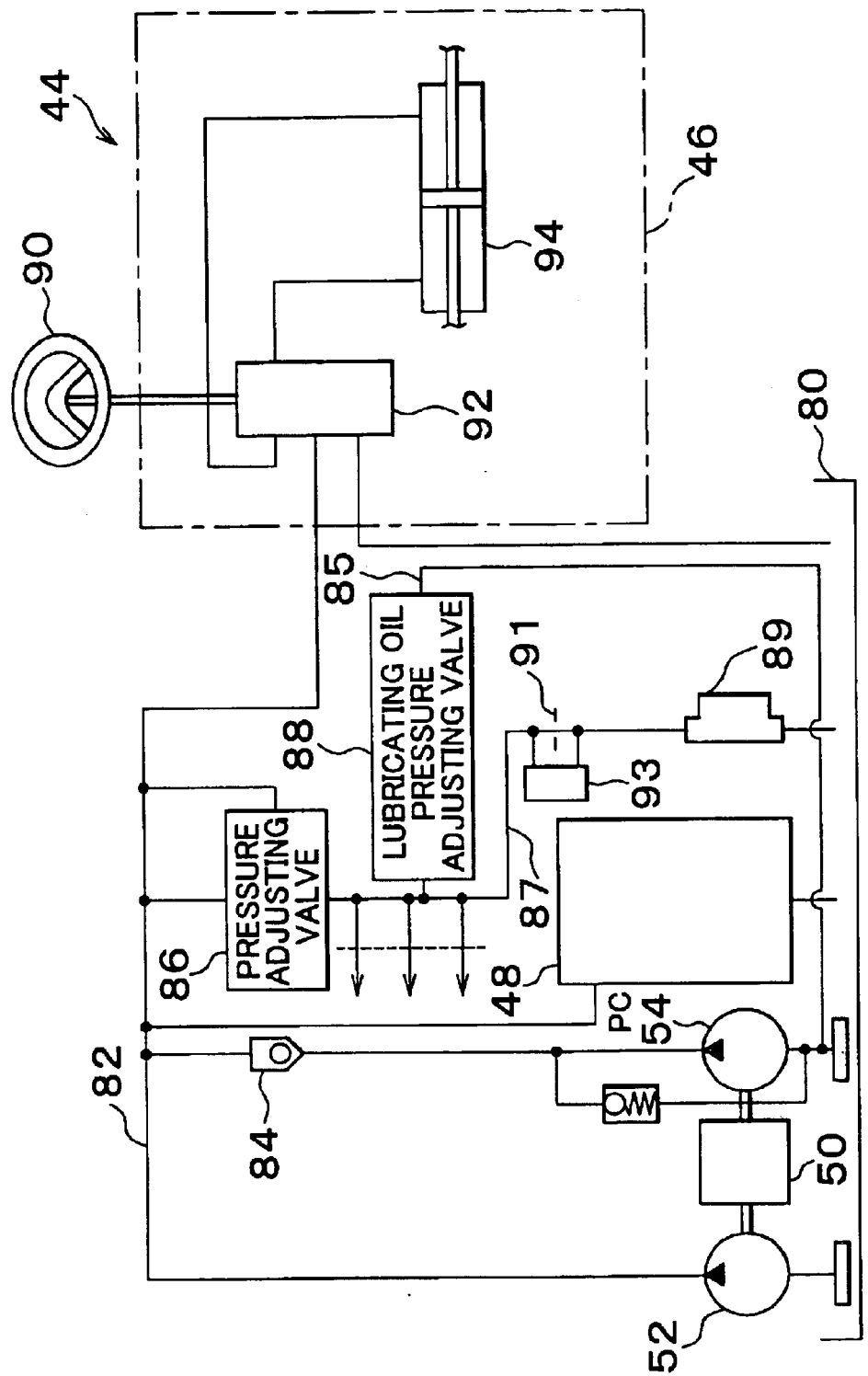
FIG. 2 s a hydraulic circuit diagram schematically describing a structure of a hydraulic control apparatus provided in the vehicle in FIG. 1.

FIG. 2 is a view describing a structure of a hydraulic control apparatus 44 provided in the vehicle mentioned above. The hydraulic control apparatus 44 is provided with a power steering apparatus, that is, a hydraulic control circuit 46 for a power steering, and a hydraulic control circuit 48 for a power train (for a shift transmission and switching a traveling mode. A first hydraulic pump 52 for a power steering and a second hydraulic pump 54 for a power train switching the shift transmission and the traveling mode which are rotated by a common electric motor 50 are provided in the hydraulic control apparatus 44.

Figure 3:
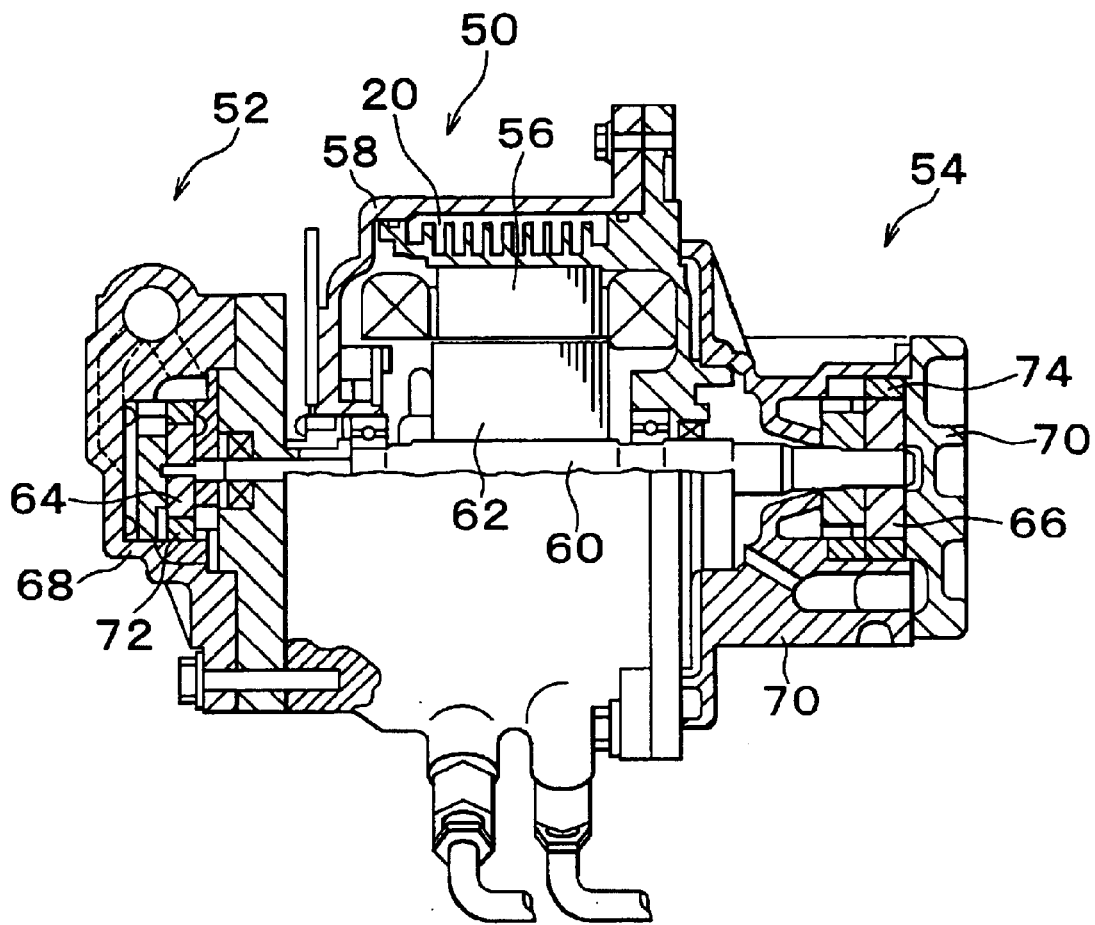
FIG. 3 is a view showing in a partly notched manner for describing a structure of an electrically driven hydraulic pump provided in the hydraulic control apparatus in FIG. 2.

FIG. 3 shows an example of an electrically driven hydraulic pump in which the electric motor 50, the first hydraulic pump 52 and the second hydraulic pump 54 are integrally constructed. In FIG. 3, a rotor 62 fixed to a center portion in a longitudinal direction of a shaft 60 rotatably supported by a bearing is rotatably received within a motor housing 58 provided with a stator coil 56 on an inner peripheral surface. Accordingly, by supplying a predetermined electric current to a stator coil 56, the rotor 62 rotates and the shaft 60 rotates.

A first rotor 64 of the first hydraulic pump 52 is mounted to a left side end portion of the shaft 60. The first rotor 64 is received within a first housing 68. A cylindrical first cam ring 72 is provided in a peripheral portion of the first rotor 64.

In the same manner, a second rotor 66 of the second hydraulic pump 54 is received within a second housing 70 in a right side end portion of the shaft 60. A cylindrical second cam ring 74 is provided in a peripheral portion of the second rotor 66.

Figure 4:
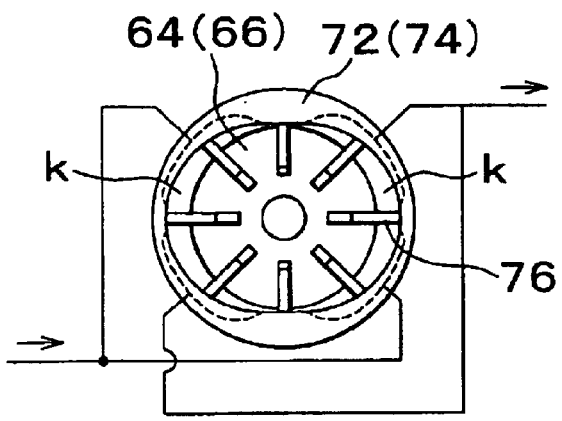
FIG. 4 is a view describing a rotor and a vane within the electrically driven hydraulic pump in FIG. 3.

As shown in detail in FIG. 4, both of the rotors 64 and 66 are provided with a plurality of vanes 76 capable of protruding in a diametrical direction from outer peripheral surfaces thereof. Both of the rotors 64 and 66 are received within a pump chamber formed within both of the cam rings 72 and 74. A crescent space k in which a cross sectional area is increased or reduced in accordance with moving towards a peripheral direction is formed between outer peripheral surfaces of both of the rotors 64 and 66 and inner peripheral surfaces of the cam rings 72 and 74 within the pump chamber. Accordingly, the shaft 60 of the electric motor 50 rotates, whereby the first rotor 64 of the first hydraulic pump 52 and the second rotor 66 of the second hydraulic pump 54 rotate, and both of the first hydraulic pump 52 and the second hydraulic pump 54 are driven. In detail, a front end of the vane 76 protruding from the outer peripheral surface thereof in accordance with the rotation of both of the rotors 64 and 66 passes through the crescent space k while being in slidably contact with inner peripheral surfaces 78 of both of the cam rings 72 and 74, whereby a working fluid is sucked and pressure fed in both of the hydraulic pumps 52 and 54.

Returning to FIG. 2, the first hydraulic pump 52 pressure feeds the working fluid flowing back within an oil tank 80 to a line oil passage 82. The second hydraulic pump 54 also pressure feeds the working fluid flowing back within the oil tank 80 to the ling oil passage 82 via a check valve 84. A line pressure adjusting valve 86 corresponds to a valve of a relief valve type, for example, adjusts an amount of relief oil in accordance with a command of an electronic control apparatus so as to adjust a line pressure, thereby generating a predetermined line pressure. A lubricating pressure adjusting valve 88 adjusts a pressure of a surplus amount of working fluid flowed out from the line pressure adjusting valve 86 to a preset pressure capable of feeding as a lubricating oil. The lubricating pressure adjusting valve 88 flows back the surplus amount of working fluid flowed out for this pressure adjustment to a suction port of the second hydraulic pump 54 through a first returning oil passage 85. A second returning oil passage 87 for cooling the lubricating oil is provided between the line pressure adjusting valve 86 and the lubricating pressure adjusting valve 88. The working fluid is also flowed back within the oil tank 80 through an oil cooler 89 provided in the second returning oil passage 87. A throttle 91 and a cooler control (bypass) valve 93 are lined up, provided between the lubricating oil pressure adjusting valve 88 or the line pressure adjusting valve 86 and the oil cooler 89. The structure is made such that the cooler control valve 93 is opened and closed, whereby a flow amount of the oil cooler 89 is switched. The cooler control valve 93 is switched and controlled by an electromagnetic valve (not shown), for example, driven in accordance with a command output from an electronic control apparatus 122 for a hybrid operation.

The hydraulic control circuit 46 for the power steering supplies the working fluid supplied through the line oil passage 82 to a steering shift cylinder 94 assisting a steering operation of the front wheels by using a rotary valve 92 operated by a steering wheel 90. Further, the hydraulic control circuit 46 for the power steering generates a driving force corresponding to a steering force applied to the steering wheel 90.

Figure 5:
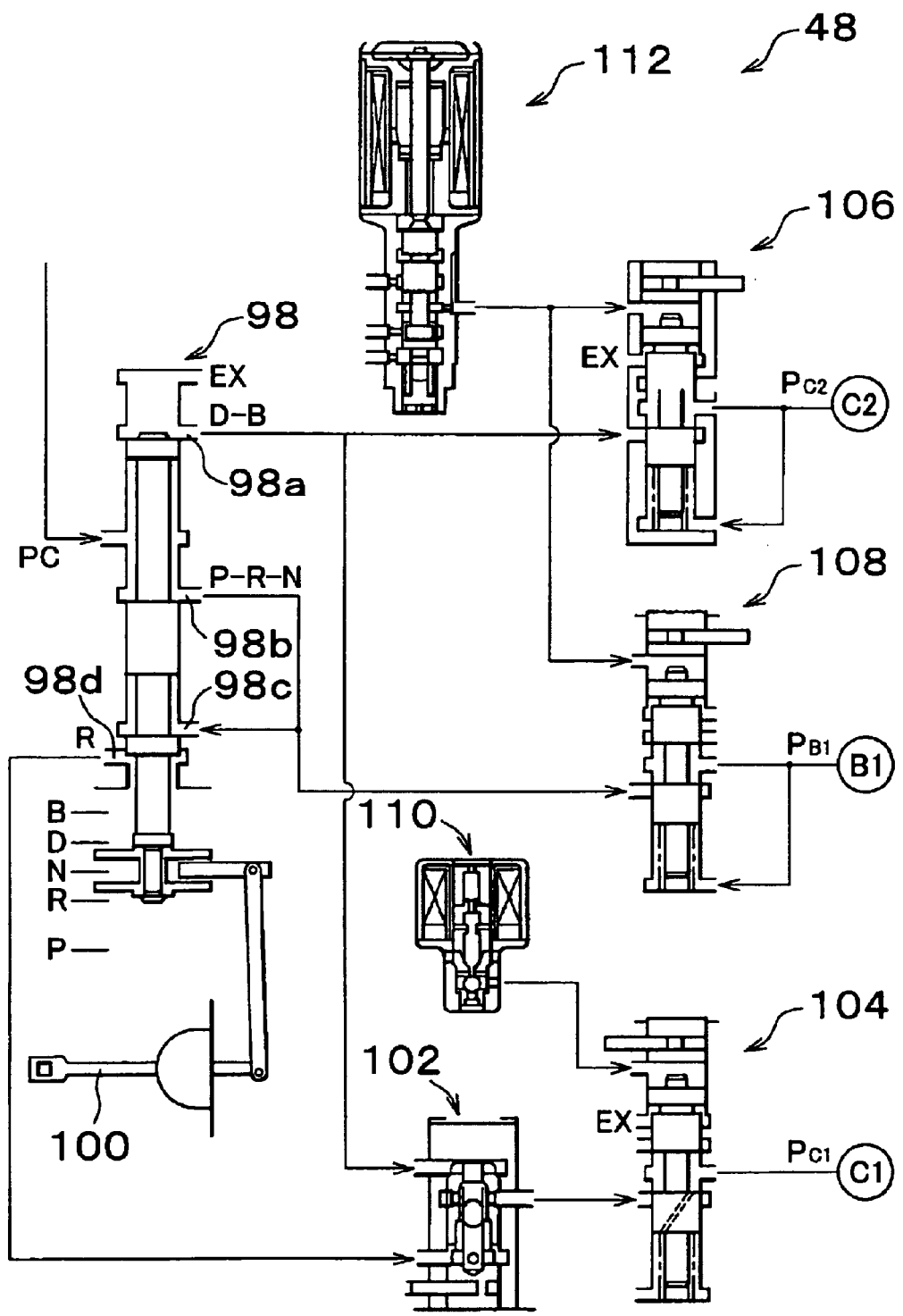
FIG. 5 is a view showing a main portion of a hydraulic control circuit for a drive train in FIG. 3.

FIG. 5 is a view showing a main portion of the hydraulic control circuit 48 for the power train. A main portion of the hydraulic control circuit 48 for the power train is structured such as to control clutches C1 and C2 and a first brake B1 corresponding to a wet multi-plate type hydraulic frictional engagement apparatus frictionally engaged by a hydraulic actuator. An original pressure PC is generated by an electrically driven pump constituted by the electric motor 50 and the second hydraulic pump 54 driven by the electric motor 50, and a pressure thereof is adjusted by the pressure adjusting valve 86. The original pressure PC is supplied to the respective clutches C1 and C2 and the brake B1 via a manual valve 98 in correspondence to a shift position of a shift lever 100. The shift lever 100 corresponds to a shift operating member operated by a driver, and is alternatively operated to a plurality of operating positions, five shift positions comprising "B", "D", "N", "R" and "P" in the present embodiment. The manual valve 98 is mechanically connected to the shift lever 100 and is switched in accordance with the operation of the shift lever 100.

The position "B" mentioned above is a shift position, in which a comparatively large power source brake is generated due to a down shift or the like of the transmission 12 at a time of traveling forward. The position "D" is a shift position for forward traveling. The original pressure PC is supplied to the clutches C1 and C2 from an output port 98a in the shift positions "B" and "D". The original pressure PC is supplied to the first clutch C1 via a shuttle valve 102.

The position "N" is a shift position for shutting off a power transmission from the power source. The position "R" is a shift position for backward traveling. The position "P" is a shift position for mechanically restricting a rotation of the drive wheels by a parking lock apparatus (not shown) as well as shutting off the power transmission from the power source. In the shift positions "N", "R" and "P", the original pressure PC is supplied to the first brake B1 from the output port 98b. Further, in the position "R", the original pressure PC output from the output port 98b passes through a returning port 98c and an output port 98d, and the original pressure PC is supplied to the first clutch C1 through a shuttle valve 102 and a control valve 104.

Control valves 104, 106 and 108 are respectively provided in the clutches C1 and C2 and the brake B1. A hydraulic pressure PC1 of the first clutch C1, a hydraulic pressure PC2 of the second clutch C2 and a hydraulic pressure PB1 of the brake B1 are respectively controlled in an independent manner by the control valves 104, 106 and 108. The hydraulic pressure PC1 of the clutch C1 is adjusted by an ON-OFF electromagnetic valve 110, and the pressures of the second clutch C2 and the brake B1 are adjusted by a linear solenoid valve 112.

In the power transmission apparatus 10 of the hybrid vehicle, the respective traveling modes shown in FIG. 6 are established in correspondence to operating states of the first clutch C1, the second clutch C2 and the brake B1. That is, in the position "B" or the position "D", any one of the "ETC mode", "direct connection mode" and "motor traveling mode (forward moving)" is established.

In the "ETC mode", there is a state that the second clutch C2 is engaged and the first clutch C1 and the first brake B1 are disengaged. In other words, in the state that the sun gear 18s, the carrier 18c and the ring gear 18r can relatively rotate, the engine 14 and the motor generator 16 are both operated so as to apply a torque to the sun gear 18s and the carrier 18c and rotate the ring gear 18r, thereby traveling the vehicle forward.

In the "direct connection mode", there is a state that the clutches C1 and C2 are engaged, and the first brake B1 is disengaged. Accordingly, the engine 14 is operated and the vehicle is traveled forward.

In the "motor traveling mode (forward moving)", there is a state that the first clutch C1 is engaged and the second clutch C2 and the first brake B1 is disengaged. Accordingly, the motor generator 16 is operated so as to travel the vehicle forward.

In the "motor traveling mode (forward moving)", it is possible to generate a power by a kinetic energy of the vehicle so as to electrically charge a battery 114 (refer to FIG. 7) by regenerating and controlling the motor generator 16 at a time when an accelerator is off or the like, and it is possible to generate a braking force in the vehicle.

Figure 7:
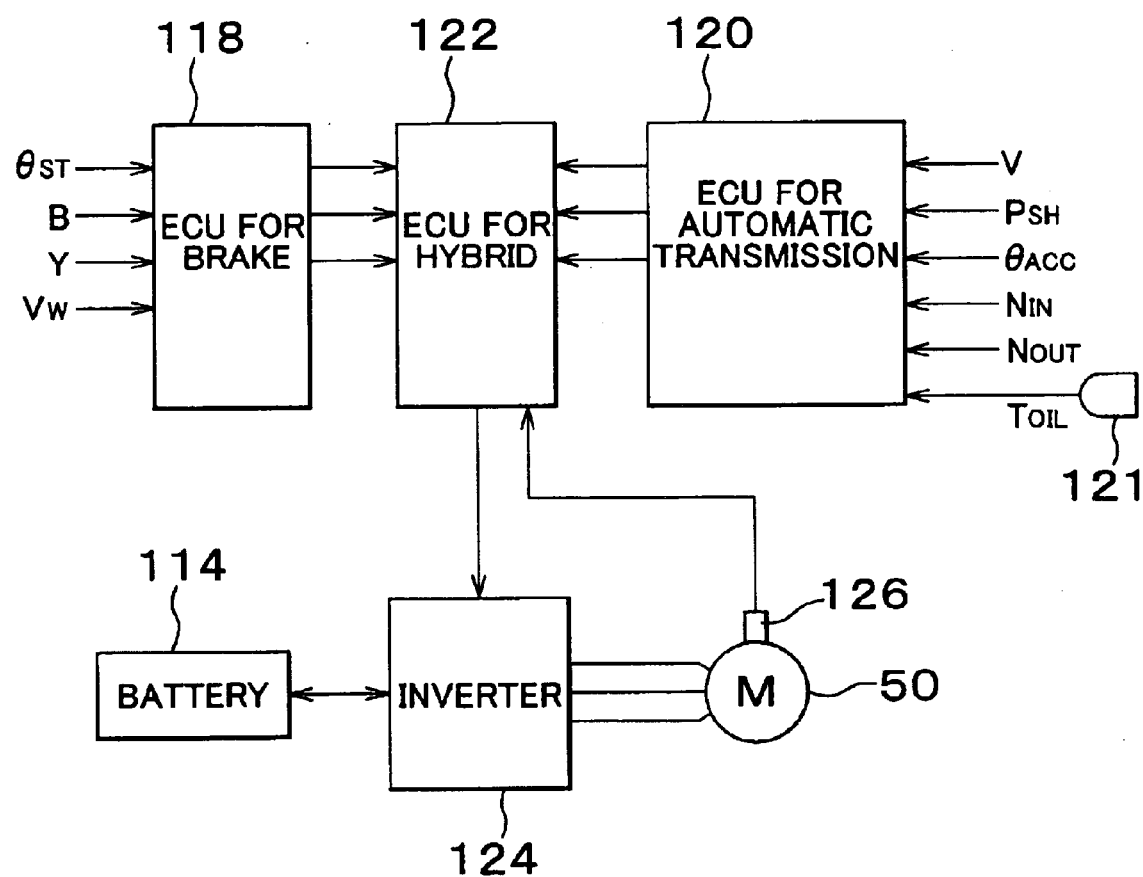
FIG. 7 is a view schematically describing a main portion of an electronic control apparatus provided in the vehicle in FIG. 1.

FIG. 7 shows a main portion of an electronic control apparatus provided in a hybrid vehicle in accordance with the present invention. In FIG. 7, an electronic control apparatus for a brake 118 is constituted by a so-called microcomputer including CPU, RAM, ROM, input and output interface and the like.

A steering angle $\theta_{sr}$ of the steering wheel 90 or the front wheels, a brake operating signal B generated by an operation of the brake pedal, respective wheel speeds Vw of the front and rear wheels, a yaw rate Y and the like are input to the brake electronic control apparatus 118 from sensors (not shown). The CPU of the brake electronic control apparatus 118 processes the input signals in accordance with a previously stored program. The CPU of the brake electronic control apparatus 118 executes an antilock brake control for stabilizing a vehicle motion particularly at a time of braking on the load having a low $\mu$ value, a turning motion control for restricting an oversteer or an understeer so as to stabilize a vehicle motion particularly at a time of turning on the road having the low $\mu$ value, and the like.

An electronic control apparatus for an automatic transmission 120 is constituted by the same microcomputer, and a vehicle speed V, an input shaft rotational speed $N_{IN}$, an output shaft rotational speed $N_{OUT}$, an accelerator pedal operating amount $\theta_{ACC}$, a shift position $P_{SH}$, of the shift lever 100, a temperature $T_{OIL}$ of the working fluid in the power steering hydraulic control circuit 46 or the power train hydraulic control circuit 48 detected by an oil temperature sensor 121, and the like are input thereto from sensors (not shown). A CPU of the automatic transmission electronic control apparatus 120 processes the input signals in accordance with a previously stored program, and determines a target shift transmission value γM on the basis of the accelerator pedal operating amount $\eta_{ACC}$ and the vehicle speed V from a relation previously calculated so as to obtain an improved specific fuel consumption so that the value becomes greater as they become greater. Further, the CPU of the automatic transmission electronic control apparatus 120 controls an actual shift transmission ratio γ of the automatic transmission 12 so as to coincide with the target shift transmission ratio γM, thereby setting an optimum shift transmission ratio γ for increasing an efficiency of generating or transmitting the power. For example, when the vehicle speed is reduced in accordance with a sudden braking, the target shift transmission ratio γM mentioned above is suddenly reduced and the sudden speed reduction shift transmission is executed.

The hybrid electronic control apparatus 122 is constituted by the same microcomputer as mentioned above. The hybrid electronic control apparatus 122 is connected between the brake electronic control apparatus 118 and the automatic shift transmission electronic control apparatus 120 via a communication line, whereby a required signal can be communicated with each other. The structure is made such that signals such as an electric charge residual quantity SOC of the battery 114, a rotational speed of the electric motor 50 and the like are input to the hybrid electronic control apparatus 122. The CPU of the hybrid electronic control apparatus 122 processes the input signals in accordance with a previously stored program. The CPU of the hybrid electronic control apparatus 122 selects any one of the traveling modes in FIG. 6 on the basis of the operating position of the shift lever 100, the electric charge residual quantity SOC of the battery 114, the accelerator pedal operating amount $\theta_{ACC}$, the brake operating signal and the like. The CPU of the hybrid electronic control apparatus 122 controls an engagement pressure of the clutches C1 and C2 or the brake B1 by using the ON-OFF electromagnetic valve 110 and the linear solenoid valve 112 so that the selected traveling mode is established. Further, the hybrid electromagnetic control apparatus 122 executes a starter control for starting the engine 14 by rotating the motor generator 16 in a state of engaging the brake B1. Further, the hybrid electronic control apparatus 122 necessarily and sufficiently controls the rotational speeds of the first hydraulic pump 52 and the second hydraulic pump 54 functioning as the oil pressure source of the hydraulic control apparatus 44, that is, a rotational speed $N_{OP}$ of the common electric motor 50 for driving them. The inverter 124 electrically charges the battery 114 by using a power generating energy output from the motor generator 16 on the basis of the regeneration control in accordance with the command from the hybrid electronic control apparatus 122. The inverter 124 supplies a three-phase alternating drive current, for example, some hundreds volts, to the electric motor 50 for the purpose of controlling the rotational speed $N_{OP}$ of the electric motor 50. In this case, in FIG. 7, a hall device 126 is attached to the electric motor 50 for the purpose of detecting the rotational speed of the electric motor 50, that is, the rotational speed $N_{OP}$ of the first hydraulic pump 52 and the second hydraulic pump 54, and functions as the rotational speed sensor.

Figure 8:
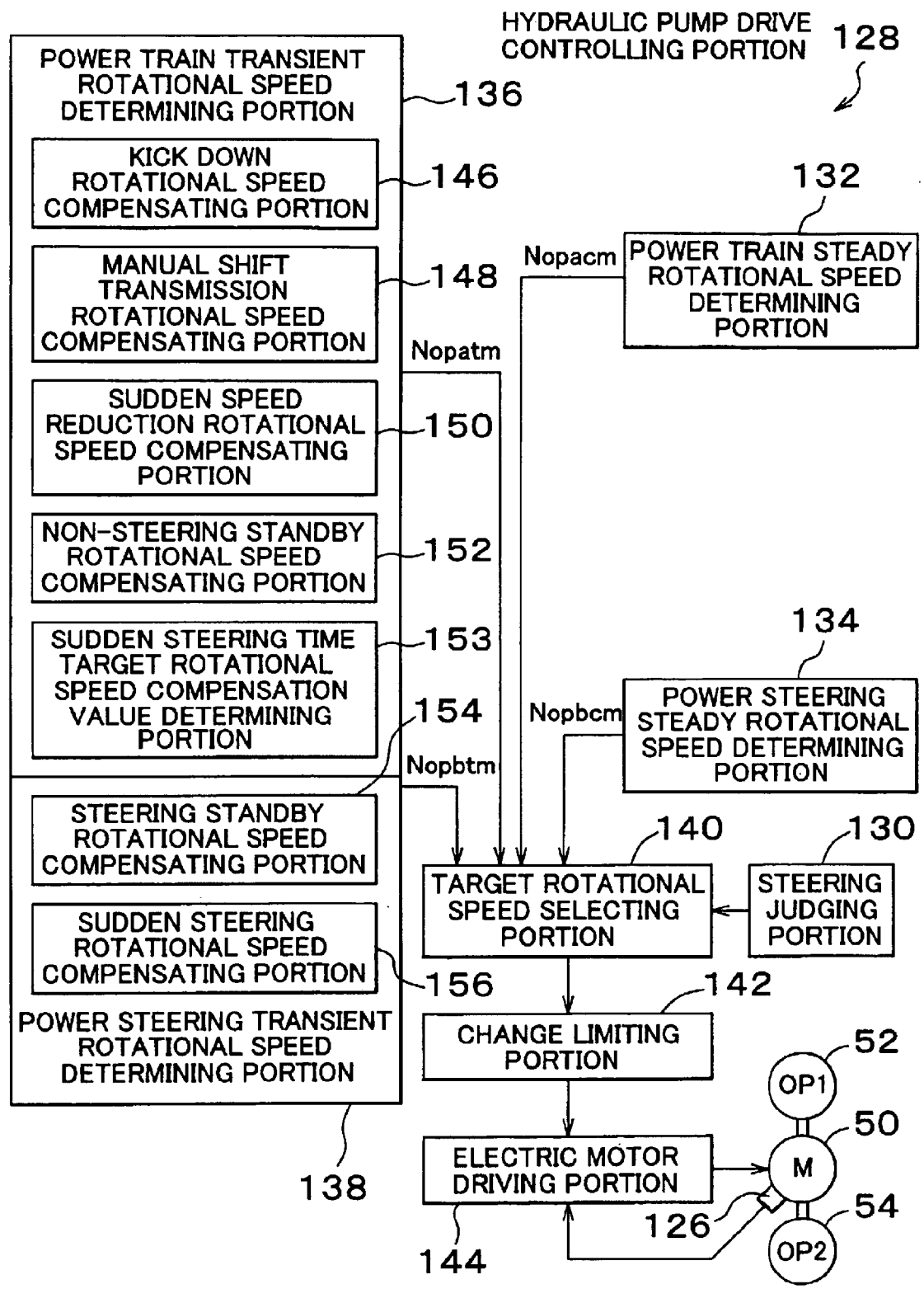
FIG. 8 is a function block diagram describing a main portion of a control function of a electronic control apparatus for a hybrid operation in FIG. 7.

FIG. 8 is a function block diagram describing a main portion of the control function of the hybrid electronic control apparatus 122. The function block diagram describes the control function for necessarily and sufficiently securing the amount of the working fluid required in the power steering hydraulic control circuit 46 and the power train hydraulic control circuit 48 by a little electric power consumption.

A hydraulic pump drive controlling portion 128 is provided with a steering judging portion 130, a power train steady rotational speed determining portion 132, a power steering steady rotational speed determining portion 134, a power train transient rotational speed determining portion 136, a power steering transient rotational speed determining portion 138, a target rotational speed selecting portion 140, a change limiting portion 142 and an electric motor driving portion 144.

The steering judging portion 130 judges whether or not the steering operation is going to be executed for the purpose of turning the vehicle, for example, on the basis of a matter the steering angle of the steering wheel 90 detected by a steering angle sensor (not shown) becomes over a predetermined value, for example, about 30 degrees.

In this case, the power train steady rotational speed determining portion 132 determines a power train steady target rotational speed for obtaining the working fluid required in the hydraulic pressure control of the automatic transmission 12 in a steady state of the vehicle, that is, the power train hydraulic control circuit 48. The power steering steady rotational speed determining portion 134 determines a steady target rotational speed for obtaining the working fluid required in the hydraulic pressure control of the power steering apparatus in a steady state of the vehicle, that is, the power steering hydraulic control circuit 46. The power train transient rotational speed determining portion 136 determines a power train transient target rotational speed for obtaining the working fluid required in the hydraulic pressure control of the automatic transmission 12 in a non-steady time of the vehicle, that is, at a transient time, that is, the power train hydraulic control circuit 48. The power steering transient rotational speed determining portion 138 determines a power steering transient target rotational speed for obtaining the working fluid required in the hydraulic pressure control of the power steering apparatus in a non-steady state of the vehicle, that is, at a transient time, that is, the power steering hydraulic control circuit 46. The target rotational speed selecting portion 140 selects any higher rotational speed as a target rotational speed Nopm among the rotational speed of the first hydraulic pump 52 for obtaining the working fluid required in the hydraulic pressure control of the power steering 90 (FIG.2) and the rotational speed of the second hydraulic pump 54 for obtaining the working fluid required in the hydraulic pressure control of the automatic transmission 12. The change limiting portion 142 limits a changing rate of the target rotational speed Nopm to be equal to or less than a predetermined value so as to prevent the target rotational speed Nopm from sudden change. The electric motor driving portion 144 controls the electric motor 50 so that the target rotational speed Nopm coincides with the actual rotational speed Nop of the first hydraulic pump 52 and the second hydraulic pump 54.

Further, the hydraulic pump drive controlling portion 128 drives and controls the electric motor 50 so as to have any higher rotational speed among the (target) rotational speed of the first hydraulic pump 52 for obtaining the amount of working fluid required in the power steering hydraulic control circuit 46 and the (target) rotational speed of the second hydraulic pump 54 for obtaining the amount of working fluid required in the hydraulic control circuit 48 of the automatic transmission 12.

The power train steady rotational speed determining portion 132 determines a power train steady target rotational speed Nopacm. In particular, it is executed from a previously stored relation on the basis of a target line pressure corresponding to a function between a shift transmission ratio $\gamma$ (=rotational speed Nin of input shaft 22/rotational speed Nout of output shaft 26) of the actual transmission (the belt type continuously variable transmission) 12 and an input torque Tin, a working fluid temperature $T_{OIL}$ of the power train hydraulic control circuit 48, and the shift position of the shift lever 100.

The power steering steady rotational speed determining portion 134 determines a power steering steady target rotational speed Nopbcm from a previously stored relation on the basis of the working fluid temperature $T_{OIL}$ of the actual power steering hydraulic control circuit 46.

The power train transient rotational speed determining portion 136 is provided with a kick down rotational speed compensating portion 146, a manual shift transmission rotational speed compensating portion 148, a sudden speed reduction rotational speed compensating portion 150, a non-steering standby rotational speed compensating portion 152, and a sudden steering time target rotational speed compensating portion 156.

In this case, the kick down rotational speed compensating portion 146 includes a kick down judging portion for judging a kick down operation corresponding to a wide pedaling of an accelerator pedal expecting a sudden acceleration. When the kick down operation is judged by the kick down judging portion, the kick down rotational speed compensating portion 146 determines a target rotational speed compensation value ΔNopatm1 at the kick down time for securing the amount of the working fluid required for increasing a response at a time of sudden acceleration. The target rotational speed compensation value ΔNopatm1 is determined from a previously stored relation on the basis of the actual shift transmission ratio $\gamma$, the operating position of the shift lever 100, the accelerator opening degree (the operating amount of the accelerator pedal) $\theta$acc, and its change rate d $\theta$acc/dt.

The manual shift transmission rotational speed compensating portion 148 includes a manual shift transmitting operation judging portion for judging a manual shift transmission applied by the operation of the shift lever 100. When the manual shift transmitting operation is judged by the manual shift transmitting operation judging portion, the manual shift transmission rotational speed compensating portion 148 determines a target rotational speed compensation value ΔNopatm2 for securing the amount of working fluid required for increasing a response at a time of manual shift transmission. The target rotational speed compensation value ΔNopatm2 is determined from a previously stored relation on the basis of the actual shift transmission ratio $\gamma$, the operating position of the shift lever 100, the accelerator opening degree (the operating amount of the accelerator pedal) $\theta$acc, and its change rate d $\theta$acc/dt.

The sudden speed reduction rotational speed compensating portion 150 includes a sudden speed reduction judging portion for judging a sudden speed reduction state applied by the sudden braking. When the sudden speed reduction state of the vehicle is judged by the sudden speed reduction judging portion, the sudden speed reduction rotational speed compensating portion 150 determines a sudden braking time target rotational speed compensation value ΔNopatm3 for securing the amount of working fluid required for realizing the sudden speed reduction shift transmission at a time of the sudden braking. The sudden braking time target rotational speed compensation value ΔNopatm3 is determined from a previously stored relation on the basis of the actual shift transmission ratio $\gamma$, the operating position of the shift lever 100, the accelerator opening degree (the operating amount of the accelerator pedal) $\theta$acc, and its change rate d $\theta$acc/dt.

The non-steering standby rotational speed compensating portion 152 includes a direct advance standby state judging portion. The direct advance standby state judging portion judges a standby (direct advance traveling waiting) state on the basis of a matter that the vehicle stops in a state that the engine 14 is disengaged from the power transmission system. The matter that the vehicle stops is based on a matter that the vehicle speed V in the standby state is 0, that the shift lever 100 is at the P position or the N position, or that the motor traveling mode and the brake pedaling force in the traveling range are equal to or more than a predetermined value. When the direct advance standby state is judged by the direct advance standby state judging portion, the non-steering standby rotational speed compensating portion 152 determines a preset non-steering standby time target rotational speed compensation value ΔNopatm4.

The sudden steering time target rotational speed compensating portion 156 determines a compensation value ΔNopatm5 in correspondence to the steering state of the steering wheel (the power steering apparatus) 90.

Further, the power train transient rotational speed determining portion 136 calculates a power train transient target rotational speed Nopatm for securing the amount of working fluid required in the power train hydraulic control circuit 48 at the respective transient times. The power train transient target rotational speed Nopatm is calculated by adding the power train target rotational speed compensating values ΔNopatm1, ΔNopatm2, ΔNopatm3, ΔNopatm4 and ΔNopatm5 to the power train steady target rotational speed Nopacm determined by the above mentioned power train steady rotational speed determining portion 132. That is, the power train transient target rotational speed Nopatm =Nopacm+ΔNopatm1+ΔNopatm2+ΔNopatm3+ΔNopatm5.

The power steering transient rotational speed determining portion 138 is provided with a steering standby rotational speed compensating portion 154 and a sudden steering rotational speed compensating portion 156.

The steering standby rotational speed compensating portion 154 includes a turning standby judging portion, and determines a previously set steering standby time target rotational speed compensating value ΔNopbtm1 when a turning standby state is judged by the turning standby judging portion. The turning standby judging portion judges the standby (turning travel waiting) state of the vehicle on the basis of a matter that the vehicle is going to be steered and stopped in a state that the engine 14 is disengaged from the power transmission system. The stopping state mentioned above is based on the matter that the vehicle speed V is 0 in the standby state of the vehicle, and the shift lever 100 is at the P position or the N position, or the motor traveling mode in the traveling range and the brake pedaling force are equal to or more than a predetermined value.

The sudden steering rotational speed compensating portion 156 includes a sudden steering operation judging portion for judging a sudden steering operation in which a change rate of the steering angle is over a predetermined value, and determines a sudden steering time target rotational speed compensating value ΔNopbtm2. When the sudden steering operation is judged by the sudden operation judging portion, the sudden steering operation rotational speed compensating portion 156 determines a previously stored sudden steering time target rotational speed compensating value ΔNopbtm2 for securing the amount of the working fluid required in the power steering hydraulic control circuit 46 for securing a response at the sudden steering time.

The power steering transient rotational speed determining portion 138 calculates a power steering transient target rotational speed Nopbtm for securing the amount of the working fluid required in the power steering hydraulic control circuit 46 at the respective transient times. The power steering transient target rotational speed Nopbtm is calculated by respectively adding the compensating values ΔNopbtm1 and ΔNopbtm2 at the transient time to the power steering steady target rotational speed Nopbcm determined by the power steering steady rotational speed determining portion 134. That is, the power steering transient target rotational speed Nopbtm =Nopbcm+ΔNopbtm1+ΔNopbtm2.

Further, the target rotational speed selecting portion 140 determines any higher rotational speed as a target rotational speed Nopm among the target rotational speed Nopbtm and the power train steady target rotational speed Nopatm in the case that the vehicle is in the steady state, for example, a constant speed traveling and the vehicle is judged by the steering judging portion 130 to be going to be steered. The target rotational speed Nopbtm is determined by the power steering transient rotational speed determining portion 138 so as to obtain the amount of the working fluid required for the hydraulic pressure control of the power steering 90. The power train steady target rotational speed Nopatm is determined by the power train transient time target rotational speed determining portion 136 so as to obtain the amount of the working fluid required in the hydraulic control circuit 48 of the automatic transmission 12.

However, in the case that it is judged by the steering judging portion 130 that the vehicle is not going to be steered, the power train steady target rotational speed Nopatm determined by the power train target rotational speed determining portion 136 is determined as the target rotational speed Nopm.

Further, when the vehicle is in the steady state and is not going to be steered, the target rotational speed selecting portion 140 selects the power train steady target rotational speed Nopacm determined by the power train steady rotational speed determining portion 132 as the target rotational speed Nopm.

In the case that the target rotational speed Nopm newly selected by the target rotational speed selecting portion 140 changes with respect to the current value, the change limiting portion 142 limits the change within a preset change rate or a preset change speed, whereby the change rate is reduced and the target rotational speed Nopm is slowly changed. The preset limit rate and change speed are provided for the purpose of reducing an electric power consumption at a time of changing the rotational speed of the electric motor 50 with avoiding the sudden change of the target rotational speed, and is previously determined in an experimental manner.

The electric motor driving portion 144 corresponding to the hydraulic pump driving portion controls a driving electric current (an amount of control operation) $I_{opn}$ supplied to the electric motor 50, for example, in accordance with the following feedback control formula 1 so that the electric motor 50 follows or coincides with the target rotational speed Nopm. In this case, the electric motor 50 becomes the actual rotational speed $N_{op}$ of the first hydraulic pump 52 and the second hydraulic pump 54.

In this case, in the feedback control formula 1, $I_{FF}$ is a feed forward amount determined in accordance with the battery voltage and the target rotational speed, $k_p$ is a proportional control constant, $k_I$ is an integral control constant and $k_D$ is a differential control constant.

(Feedback control formula 1)

$$I_{OPn}=I_{FF}+k_p(N_{OP}^M-N_{OP})+k_I\int(N_{OP}^M-N_{OP})dt+k_Dd(N_{OP}^M-N_{OP})/dt$$

Figure 9:
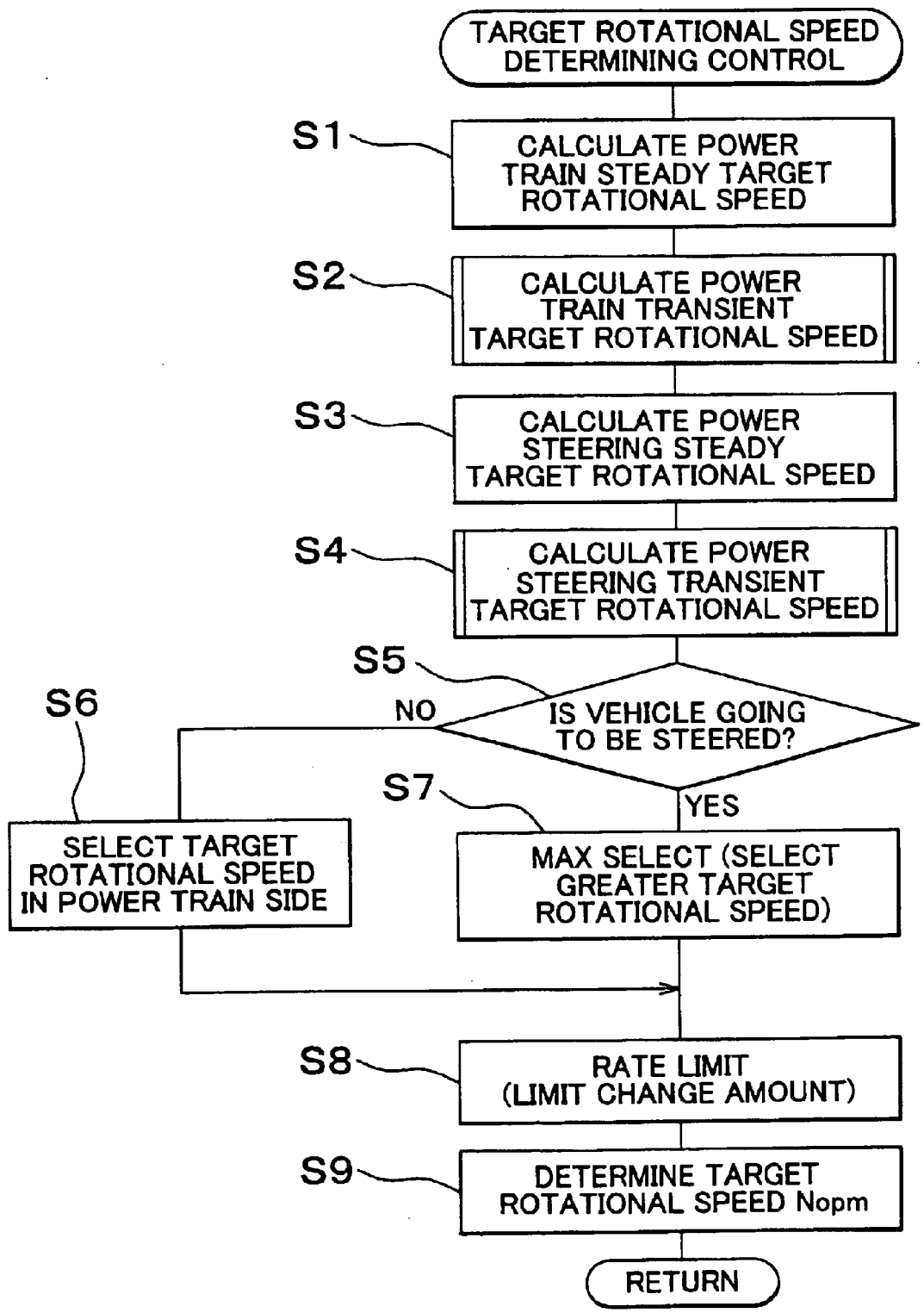
FIG. 9 is a flow chart describing a main portion of a control operation of the electronic control apparatus for the hybrid operation in FIG. 7, which shows a target rotational speed determining control routine.
Figure 10:
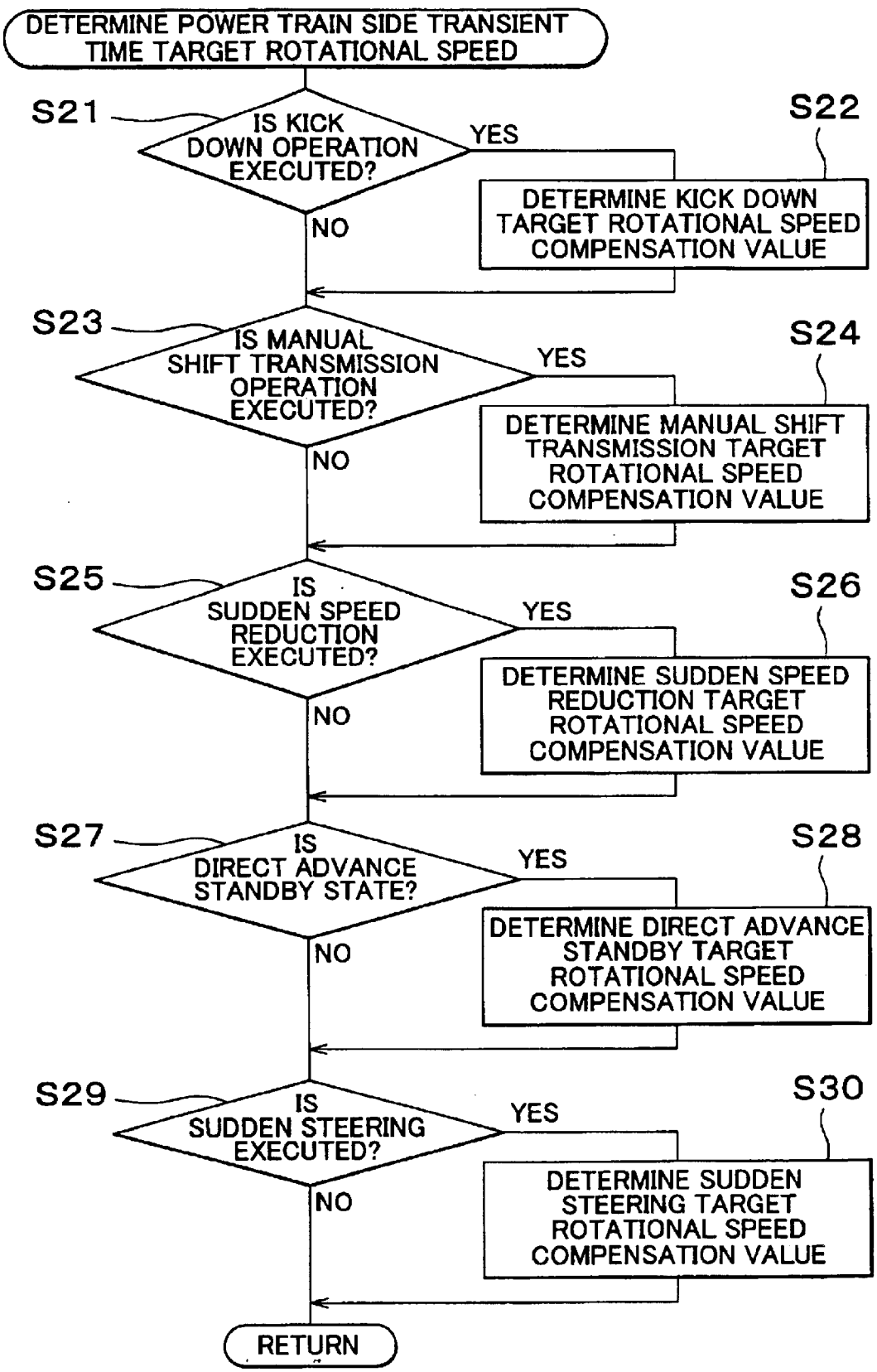
FIG. 10 is a flow chart describing a main portion of the control operation of the electronic control apparatus for the hybrid operation in FIG. 7, which shows the target rotational speed determining control routine in a power train side at a time of transition in FIG. 9.
Figure 11:
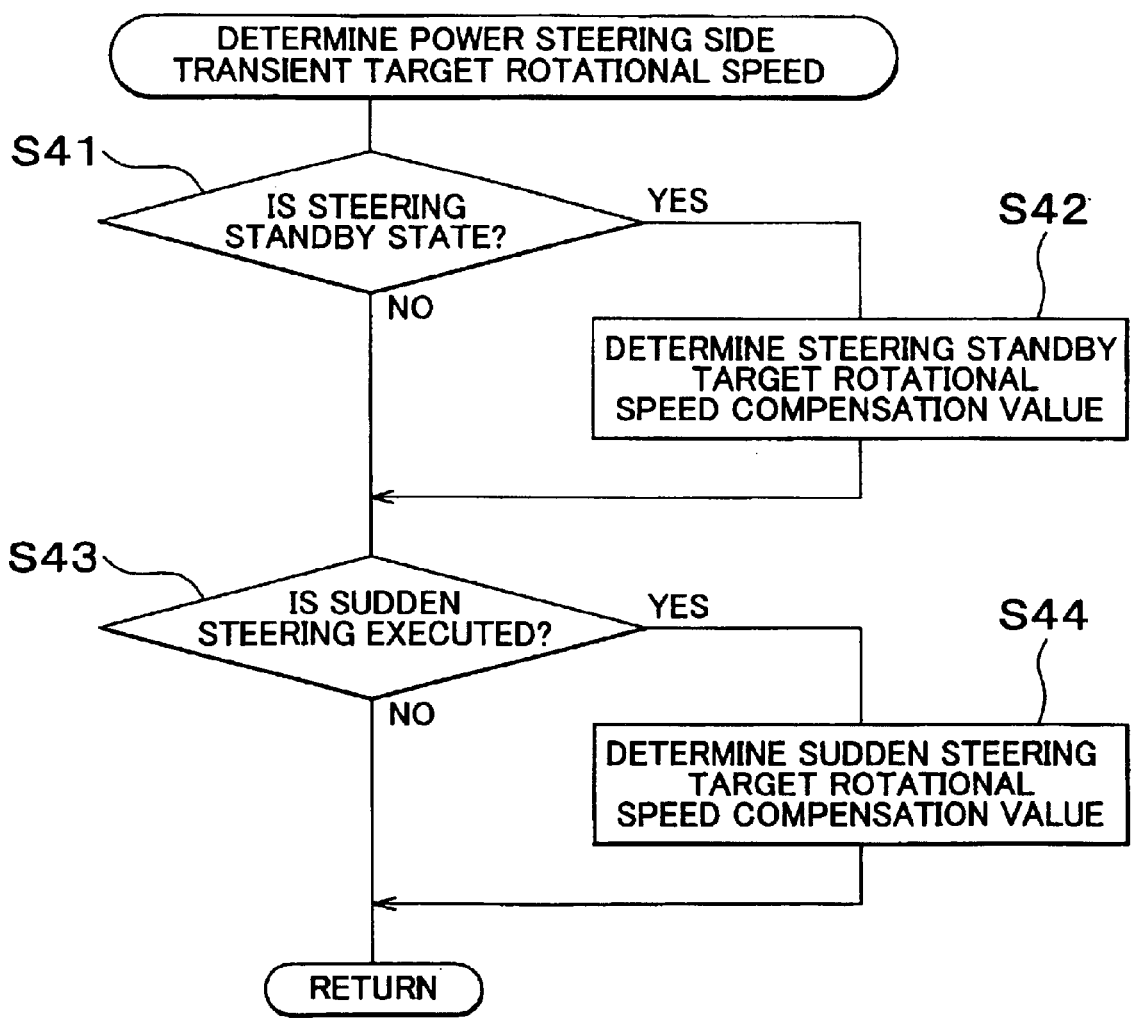
FIG. 11 is a flow chart describing a main portion of the control operation of the electronic control apparatus for the hybrid operation in FIG. 7, which shows the target rotational speed determining control routine in a power steering side at a time of transition in FIG. 9.

FIGS. 9, 10 and 11 are flow charts of a main portion of the control operation in the hybrid electronic control apparatus 122. The respective drawings describe the control operation for necessarily and sufficiently securing the mount of the working fluid required in the power steering hydraulic control circuit 46 and the amount of the working fluid required in the power train hydraulic control circuit 48 by a little electric power consumption. FIG. 9 shows a target rotational speed determining control routine. FIG. 10 shows a transient time power train target rotational speed determining control routine (S2) in FIG. 9. FIG. 11 shows a transient time power steering target rotational speed determining control routine (S4) in FIG. 9.

In FIG. 9, in a step S1 corresponding to the power train steady rotational speed determining portion 132, the power train steady target rotational speed Nopacm is calculated. The power train steady target rotational speed Nopacm is calculated from a previously stored relation on the basis of the shift transmission ratio γ (=rotational speed Nin of input shaft 22/rotational speed Nout of output shaft 26) of the actual transmission (the belt type continuously variable transmission) 12 and a target line pressure corresponding to a function of the input torque Tin, a working fluid temperature $T_{OIL}$ of the power train hydraulic control circuit 48, and the shift position of the shift lever 100.

Next, in a step S2 corresponding to the power train transient rotational speed determining portion 136, the power train transient target rotational speed Nopatm is calculated. The power train transient target rotational speed Nopatm is calculated by adding the power train target rotational speed compensating values ΔNopatm1, ΔNopatm2, ΔNopatm3, ΔNopatm4 and ΔNopatm5, for example, determined in a routine shown in FIG. 10 to the power train steady target rotational speed Nopacm determined in accordance with the step S1, for the purpose of securing the amount of the working fluid required in the power train hydraulic control circuit 48 at the transient time. That is, the power train transient target rotational speed Nopatm=Nopacm+ΔNopatm1+ΔNopatm2+ΔNopatm3+ΔNopatm4+ΔNopatm5.

In FIG. 10, in a step S21 corresponding to the kick down judging portion, it is judged whether or not the kick down operation corresponding to the wide pedaling operation of the accelerator pedal expecting the sudden acceleration is executed.

In the case that the judgement in the step S21 is affirmed, the control moves to step S22. In the step S22, the target rotational speed compensation value ΔNopatm1 at the kick down time is calculated from the previously stored relation for securing the amount of the working fluid required for increasing the response at a time of sudden acceleration on the basis of the actual shift transmission ratio γ, the operating position of the shift lever 100, the accelerator opening degree (the operating amount of the accelerator pedal) θacc, and its change rate d θacc/dt. The steps S21 and S22 correspond to the kick down rotational speed compensating portion 146.

In the case that the judgement in the step S21 is denied, the control moves to step S23 corresponding to the manual shift transmission operation judging portion. In the step S23, it is judged whether or not the manual shift transmission (speed reduction) operation is executed on the basis of the change of the operating position of the shift lever 100, for example, the operation D→L.

In the case that the judgement in the step S23 is affirmed, the control moves to step S24. In the step S24, the target rotational speed compensation value ΔNopatm2 at the manual shift transmission time is calculated from the previously stored relation for securing the amount of the working fluid required for increasing the response at a time of manual shift transmission on the basis of the actual shift transmission ratio γ, the operating position of the shift lever 100, the accelerator opening degree (the operating amount of the accelerator pedal) θacc, and its change rate d θacc/dt. The steps S23 and S24 correspond to the manual shift transmission rotational speed compensating portion 148.

In the case that the judgement in the step S23 is denied, the control moves to step S25 corresponding to the sudden speed reduction judging portion. In the step S25, it is judged on the basis of the operating amount change rate of the accelerator pedal, the acceleration detected by the acceleration sensor, the rotational acceleration of the tire wheel, a matter that the braking oil pressure becomes over the predetermined value and the like, whether or not the sudden braking of the vehicle, that is, the sudden speed reduction is executed.

In the case that the judgement in the step S25 is affirmed, the control moves to step S26. In the step S26, the sudden braking time target rotational speed compensation value ΔNopatm3 is calculated for securing the amount of the working fluid required for realizing the sudden speed reduction shift transmission at a time of the sudden braking. The sudden braking time target rotational speed compensation value ΔNopatm3 is based on the actual shift transmission ratio γ, the operating position of the shift lever 100, the accelerator opening degree (the operating amount of the accelerator pedal) θacc, and its change rate d θacc/dt from the previously stored relation. The steps S25 and S26 correspond to the sudden speed reduction rotational speed compensating portion 150.

In the case that the judgement of the step S25 is denied, the control moves to step S27 corresponding to the direct advance standby judging portion. In the step S27, it is judged whether or not the vehicle under not being steered is in the direct advance standby state, that is, the vehicle stops in the state that the engine 14 is disengaged from the power transmission system. The state that the vehicle stops as mentioned above is based on the matter that the vehicle speed V in the standby state is 0, that the shift lever 100 is at the P position or the N position, and that the motor traveling mode is executed.

In the case that the judgement in the step S27 is affirmed, the control moves to step S28. In the step S28, the preset non-steering standby time target rotational speed compensation value ΔNopatm4 is set. The steps S27 and S28 correspond to the non-steering standby rotational speed compensating portion 152.

In the case that the judgement in the step S27 is denied, the control moves to step S29 corresponding to the sudden steering judging portion. In the step S29, it is judged whether or not the steering angular speed corresponds to a sudden steering operation having a predetermined angle or more. In the case that the judgement in the step S29 is affirmed, the control moves to step S30. In the step S30, the sudden steering time target rotational speed compensation value ΔNopatm5 is determined in correspondence to the steering angular speed, that is, the value is determined to be larger in accordance with the steering angular speed becomes higher.

Returning to FIG. 9, in a step S3 corresponding to the power steering steady rotational speed determining portion 134, the power steering steady target rotational speed Nopbcm is calculated from the previously stored relation mentioned above on the basis of the working fluid temperature $T_{OIL}$ of the actual power steering hydraulic control circuit 46.

Next, in a step S4 corresponding to the power steering transient rotational speed determining portion 138, the power steering transient target rotational speed Nopbtm is calculated. The power steering transient target rotational speed Nopbtm is calculated by respectively adding the power steering target rotational speed compensating values ΔNopbtm1 and ΔNopbtm2 at the transient time, for example, determined in a routine shown in FIG. 11 to the power steering steady target rotational speed Nopbcm calculated in the step S3, for securing the amount of the working fluid required in the hydraulic control circuit 46 of the power steering apparatus at the transient time. That is, the power steering transient target rotational speed Nopbtm=Nopbcm+ΔNopbtm1+ΔNopbtm2.

In FIG. 11, in a step S41 corresponding to the turning standby judging portion, it is judged whether or not the vehicle under being steered is in the standby state, that is, the vehicle stops in the state that the engine 14 is disengaged from the power transmission system. The judgement is executed on the basis of the matter that the vehicle speed V in the standby state is 0, that the shift lever 100 is at the P position or the N position, and that the motor traveling mode is executed.

In the case that the judgement in the step S41 is affirmed, the control moves to step S42. In the step S42, the preset non-steering standby time target rotational speed compensation value ΔNopbtm1 is set. The steps S41 and S42 correspond to the steering standby rotational speed compensating portion 154.

Next, in a step S43 corresponding to the sudden steering judging portion, it is judged on the basis of the matter that the change rate of the operation angle of the steering wheel 90 is over a predetermined value whether or not the steering operation is a sudden steering operation. In the case that the judgement in the step S43 is affirmed, the control moves to step S44. In the step S44, the previously stored sudden steering time target rotational speed compensation value ΔNopbtm2 is set for securing the amount of the working fluid required in the power steering hydraulic control circuit 46 so as to obtain the response at the sudden steering time. The steps S43 and S44 correspond to the sudden steering rotational speed compensating portion 156.

Returning to FIG. 9, in a step S5 corresponding to the steering judging portion 130, it is judged on the basis of a matter that the steering angle of the steering wheel 90, for example, detected by a steering angle sensor (not shown) surpasses the predetermined value, for example, about 30 degrees, whether or not the vehicle is going to be steered for turning. In the case that the judgement in the step S5 is denied, in a step S6 corresponding to the target rotational speed selecting portion 140, the target rotational speed Nopacm or Nopatm in the power train side is selected as the target rotational speed Nopm, without relation to the steady traveling or the transient time. That is, in the case that the vehicle is in the steady state in which it is not necessary to operate the power steering apparatus, the power train steady target rotational speed Nopacm calculated in the step S1 is selected as the target rotational speed Nopm. Further, in the case of the transient time, the power train target rotational speed Nopatm calculated in the step S2 is selected as the target rotational speed Nopm.

However, in the case that the judgement in the step S5 is affirmed, in a step S7 corresponding to the target rotational speed selecting portion 140, the greater value in the power steering side and the power train side is selected as the target rotational speed Nopm. That is, in the case that the vehicle is in the steady state in which it is not necessary to operate the power steering apparatus, the larger value among the power train steady target rotational speed Nopacm calculated in the step S1 and the power steering steady target rotational speed Nopbcm calculated in the step S3 is selected as the target rotational speed Nopm. Further, in the case of the transient time, the larger value among the power train target rotational speed Nopatm calculated in the step S2 and the power steering transient target rotational speed Nopbtm calculated in the step S4 is selected as the target rotational speed Nopm.

Next, in a step S8 corresponding to the change limiting portion 142, after being limited within the previously set predetermined change rate or change speed so that the change of the target rotational speed Nopm selected in the step S6 or S7 is reduced, in a step S9, the limited value of the change mentioned above is sequentially determined as the target rotational speed Nopm. In a step (not shown) corresponding to the electric motor driving portion 144, the driving current of the electric motor 50 is controlled, for example, in accordance with a control formula 1, so that the actual rotational speed Nop coincides with the target rotational speed Nopm determined in the manner mentioned above.

As mentioned above, in accordance with the present embodiment, since the structure is made such that the first hydraulic pump 52 and the second hydraulic pump 54 are driven by one electric motor 50, only one motor is needed for two pumps, and it is possible to intend to lighten, reduce a cost and save an electric power consumption of the system as a whole. Accordingly, it is possible to save specific fuel consumption and save space of the vehicles.

In particular, the first hydraulic pump 52 and the second hydraulic pump 54 correspond to a pump for circulating another oil, and the pumps 52 and 54 are arranged in both sides of the electric motor 50, whereby it is possible to securely separate the oil and it is possible to arrange the oil passages or the like with a surplus.

Further, the structure is made such that the shaft 60 of the electric motor 50 protrudes to both sides and both of the hydraulic pumps 52 and 54 are spline fitted to the respective end portions, whereby it is possible to drive both of the hydraulic pumps 52 and 54 while securing an optimum shaft (shaft 60) length and a shaft strength. Further, since the hydraulic pumps 52 and 54 are connected to both sides of the shaft 60, an inertia force is evenly applied to the rotor 62 of the electric motor 50, and it is possible to prevent the rotor 62 from being deformed.

Further, the first hydraulic pump 52 is generally used at a high pressure output about 5 MPa to 10 MPa, and the second hydraulic pump 54 is also used at a pressure about 5 MPa. Accordingly, it is possible to effectively drive the pump by driving two hydraulic pumps 52 and 54 by one electric motor 50.

Further, a maximum load time of the first hydraulic pump 52 generally corresponds to a low speed traveling time, and the time when the load applied to the engine is low. On the contrary, the second hydraulic pump 54 corresponds to the time when the engine load is high such as climbing up along a steep gradient or the like. Accordingly, the occation that great loads of both pumps infrequently overlap with each other. It is possible to make the electric motor 50 comparatively small, and is possible to intend an efficient operation.

Further, in accordance with the present embodiment, the electric motor 50 is driven and controlled by the hydraulic pump drive controlling portion 128 (S1 to S9) so as to have any higher rotational speed Nopm among the rotational speed Nopbtm of the first hydraulic pump 52 for obtaining the amount of the working fluid required in the power steering hydraulic control circuit 46 and the rotational speed Nopatm of the second hydraulic pump 54 for obtaining the amount of the working fluid required in the hydraulic control circuit 48 of the automatic transmission 12. Accordingly, the working fluids respectively required in the power steering hydraulic control circuit 46 and the shift transmission controlling hydraulic control circuit 48 which are independent from each other can be necessarily and sufficiently secured by a little electric power consumption.

Further, in accordance with the present embodiment, the rotational speed Nopatm of the second hydraulic pump 54 for obtaining the amount of the working fluid required in the hydraulic control circuit 48 of the automatic transmission 12 is determined on the basis of at least one of the input torque Tin of the automatic transmission 12, the working fluid temperature $T_{OIL}$ of the hydraulic control circuit 48 for controlling the shift transmission of the automatic transmission 12 and the operating position of the shift lever 100. Accordingly, even in the case of the kick down operation time, the manual shift transmission time, the sudden speed reduction shift transmission time and the like at which a lot of working fluid is temporarily required in the hydraulic control of the automatic transmission 12, the respectively required working fluids can be necessarily and sufficiently secured by a little electric power consumption.

Further, in accordance with the present embodiment, the rotational speed Nopbtm of the first hydraulic pump 52 for obtaining the amount of the working fluid required in the power steering hydraulic control circuit 46 is determined on the basis of at least one of the working fluid temperature $T_{OIL}$ of the hydraulic control circuit 46 for assisting and controlling the steering force of the steering wheel 90 and the steering angle θst. Accordingly, even in the case that it is hard to sufficiently obtain the amount of the working fluid due to a high viscosity caused by a low temperature and in the case of the great steering angle at which a lot of working fluid is temporarily required in the power steering apparatus, the respective required working fluids can be necessarily and sufficiently secured by a little electric power consumption.

Further, in accordance with the present embodiment, the automatic transmission 12 is the belt type continuously variable transmission in which the transmission belt 30 is wound around a pair of variable pulleys 24 and 28 having the variable effective diameters and the effective diameters of a pair of variable pulleys 24 and 28 are changed by a hydraulic actuator (not shown), whereby the shift transmission ratio γ is continuously changed. The hydraulic pump drive controlling portion 128 is structured such as to determine the target rotational speed Nopatm of the second hydraulic pump 54 for obtaining the amount of the working fluid required from the shift transmission control of the automatic transmission 12 on the basis of the shift transmission ratio γ of the belt type continuously variable transmission. Accordingly, since the amount of the working fluid can be sufficiently secured, for example, even in the case that the shift transmission ration γ of the belt type continuously variable transmission suddenly changes, it is possible to suddenly change the shift transmission ratio γ.

Further, in accordance with the present embodiment, the hydraulic pump drive controlling portion 128 includes the target rotational speed selecting portion 140 (S7) and the electric motor driving portion 144. The target rotational speed selecting portion 140 selects any higher rotational speed as the target rotational speed Nopm among the rotational Nopbtm of the first hydraulic pump 52 for obtaining the amount of the working fluid required in the power steering hydraulic control circuit 46 and the rotational speed Nopatm of the second hydraulic pump 54 for obtaining the amount of the working fluid required in the hydraulic control circuit 48 of the automatic transmission 12. The electric motor driving portion 144 drives the rotational speed of the electric motor 50 so that the target rotational speed Nopm determined by the target rotational speed determining portion 140 coincides with the actual rotational speed Nop of the first hydraulic pump 52 and the second hydraulic pump 54. Accordingly, any higher one among the rotational speed Nopbtm of the first hydraulic pump 52 for obtaining the amount of the working fluid required in the power steering hydraulic control circuit 46 and the rotational speed Nopatm of the second hydraulic pump 54 for obtaining the amount of the working fluid required in the hydraulic control circuit 48 of the automatic transmission 12 is determined as the target rotational speed Nopm. Further, the electric motor 50 is driven and controlled so that the target rotational speed Nopm coincides with the actual rotational speed Nop. Accordingly, the working fluids respectively required in the power steering hydraulic control circuit 46 and the power train hydraulic control circuit 48 which are independent from each other are necessarily and sufficiently secured by a little electric power consumption.

Further, in accordance with the present embodiment, the hydraulic pump drive controlling portion 128 includes the power train rotational speed determining portion 136, the power steering rotational speed determining portion 138, the target rotational speed selecting portion 140 and the electric motor driving portion 144.

The power train rotational speed determining portion 136 determines the target rotational speed Nopatm for obtaining the working fluid required in the hydraulic control circuit 48 of the automatic transmission 12. The power steering rotational speed determining portion 138 determines the target rotational speed Nopbtm for obtaining the working fluid required in the power steering hydraulic control circuit 46. The target rotational speed selecting portion 140 selects any higher value as the target rotational speed among the target rotational speed Nopatm determined by the power train rotational speed determining portion 136 and the target rotational speed Nopbtm determined by the power steering rotational speed determining portion 138. The electric motor driving portion 144 drives the rotational speed of the electric motor so that the target rotational speed Nopm selected by the target rotational speed selecting portion 140 coincides with the actual rotational speed Nop of the first hydraulic pump 52 and the second hydraulic pump 54.

Accordingly, the electric motor 50 is driven and controlled so that the selected target rotational speed Nopm coincides with the actual rotational speed Nop. Therefore, the working fluids respectively required in the power steering apparatus and the shift transmission control corresponding to the respectively independent hydraulic control circuits can be necessarily and sufficiently secured by a little electric power consumption.

Further, in accordance with the present embodiment, there is provided the steering judging portion 130 (S5) for judging on the basis of the steering angle of the steering wheel whether or not the vehicle is going to be steered. The target rotational speed selecting portion 140 (S6, S7) selects any higher value as the target rotational speed Nopm among the target rotational speed Nopatm determined by the power train rotational speed determining portion 136 (S2) and the target rotational speed Nopbtm determined by the power steering rotational speed determining portion 138 (S4) in the case that it is judged by the steering judging portion 130 that the vehicle is going to be steered. However, in the case that it is judged by the steering judging portion 130 that the vehicle is not going to be steered, the target rotational speed Nopatm determined by the power train rotational speed determining portion 136 is determined as the target rotational speed Nopm. Accordingly, in the case of not being steered, since the power steering apparatus does not function, and it is not necessary to employ the target rotational speed determined by the power steering target rotational speed determining portion, it is possible to prevent the target rotational speed Nopbtm in the power steering side from being selected even if it is a relatively great value as mentioned above.

Further, in accordance with the present embodiment, there is provided the power train steady rotational speed determining portion 132 for determining the power train steady target rotational speed Nopacm for obtaining the amount of the working fluid required in the hydraulic control circuit 48 of the automatic transmission 12 in the steady state of the vehicle. The power train rotational speed determining portion 136 is structured such as to determine the power train transient target rotational speed Nopatm at the kick down time, the manual shift transmission time, the sudden speed reduction time, the non-steering standby time, or the low working fluid temperature time. The power train transient target rotational speed Nopatm is structured such as to determine to be a predetermined value higher than the power train steady target rotational speed Nopacm by adding the predetermined transient time compensating values $\Delta$Nopatm1, $\Delta$Nopatm2, $\Delta$Nopatm3, $\Delta$Nopatm4 and $\Delta$Nopatm5 to the power train steady target rotational speed Nopacm determined by the power train steady rotational speed determining portion 132. That is, the power train transient target rotational speed Nopatm=Nopacm+ $\Delta$Nopatm1+$\Delta$Nopatm2+$\Delta$Nopatm3+$\Delta$Nopatm4+ $\Delta$Nopatm5.

Further, there is provided the power steering steady rotational speed determining portion 134 for determining the steady target rotational speed Nopbcm for obtaining the working fluid required in the hydraulic control circuit 46 of the power steering apparatus in the steady state of the vehicle. The power steering rotational speed determining portion 138 adds the predetermined power steering target rotational speed compensating values $\Delta$Nopbtm1 and $\Delta$Nopbtm2 at the transient time to the power steering steady target rotational speed Nopbcm determined by the power steering steady rotational speed determining portion 134, at the sudden steering time, the steering standby time or the low fluid temperature time. Accordingly, it is possible to calculate the power steering transient target rotational speed Nopbtm the predetermined value higher than the power steering steady target rotational speed Nopbcm. That is, the power steering transient target rotational speed Nopbtm= Nopbcm+$\Delta$Nopbtm1+$\Delta$Nopbtm2.

Accordingly, even in the case of the kick down operation time, the manual shift transmission time, the sudden speed reduction shift transmission time and the like at which the a lot of working fluid is temporarily required in the hydraulic control circuit 48 of the automatic transmission 12, the case that it is hard to sufficiently obtain the amount of the working fluid due to the high viscosity caused by the low temperature, and the case of the great steering angular speed at which a lot of fluid is temporarily required in the power steering hydraulic control circuit 46, the respectively required working fluids can be necessarily and sufficiently secured by a little electric power consumption.

Further, even when the compensating amount $\Delta$Nopatm5 given by the steering information is applied to the value Nopatm, the load of the power steering hydraulic control apparatus 44 is suddenly increased and the reduction of the rotational speed Nop is generated, the required rotational speed in the automatic transmission side is maintained, and a lubrication reduction of the transmission is prevented.

Further, in accordance with the present embodiment, when the vehicle is in the steady state and is not going to be steered, the target rotational speed selecting portion 140 selects the power train steady target rotational speed Nopacm determined by the power train steady rotational speed determining portion 132 as the target rotational speed Nopm. Further, when the vehicle is in the steady state and is going to be steered, the target rotational speed selecting portion 140 selects any higher rotational speed as the target rotational speed Nopm among the power steering steady target rotational speed Nopbcm determined by the power steering steady rotational speed determining portion 134 and the power train steady target rotational speed Nopacm determined by the power train steady rotational speed determining portion 132. Accordingly, even in the case that the vehicle is in the steady state, it is possible to necessarily and sufficiently secure the respectively required working fluids by a little electric power consumption.

Further, in accordance with the present embodiment, there is provided the change limiting portion 142 for limiting the change of the target rotational speed Nbpm selected by the target rotational speed selecting portion 140 within the previously set change speed. Accordingly, since the sudden change of the target rotational speed Nopm used in the feedback control by the electric motor driving portion 144 can be avoided, the electric power consumption at a time of changing the rotational speed of the electric motor 50 can be reduced.

As described above, in accordance with the present invention, the structure is made such that the hydraulic pump for the power steering and the hydraulic pump for the power train are driven by one motor. Accordingly, only one motor is employed for two pumps, and it is possible to make the whole of the system light, reduce a cost thereof and save the electric power consumption thereof. Accordingly, it is possible to save the specific fuel consumption of the vehicle and save space. In particular, the maximum load time of the power steering hydraulic pump generally corresponds to the low speed traveling time, and the time when the load applied to the engine is low. On the contrary, the power train hydraulic pump corresponds to the time when the engine load is high such as the time of climbing up along the steep gradient or the like. Accordingly, the great loads of both pumps infrequently overlap with each other, it is possible to make the hydraulic pump motor comparatively small, and it is possible to intend the efficient operation.

Further, by respectively connecting the power train pump and the power steering hydraulic pump to both ends of the rotor of the hydraulic pump motor so as to arrange the pumps in both sides of the hydraulic pump motor, it is possible to securely separate the oil and it is possible to arrange the oil pipe or the like with a surplus. Further, it is possible to drive two hydraulic pumps while suitably maintaining the rotational axial length and the axial strength. Further, the inertia force of the hydraulic pump is evenly applied to the motor (particularly to the rotor) and it is possible to prevent the rotor from being deformed or the like.

Further, it is possible to cool the motor by circulating a part of the oil circulating to the power train hydraulic pump for cooling the hydraulic pump motor.

As mentioned above, the description is given of one embodiment in accordance with the present invention on the basis of the accompanying drawings, however, the present invention can be applied to the other aspects.

Figure 12:
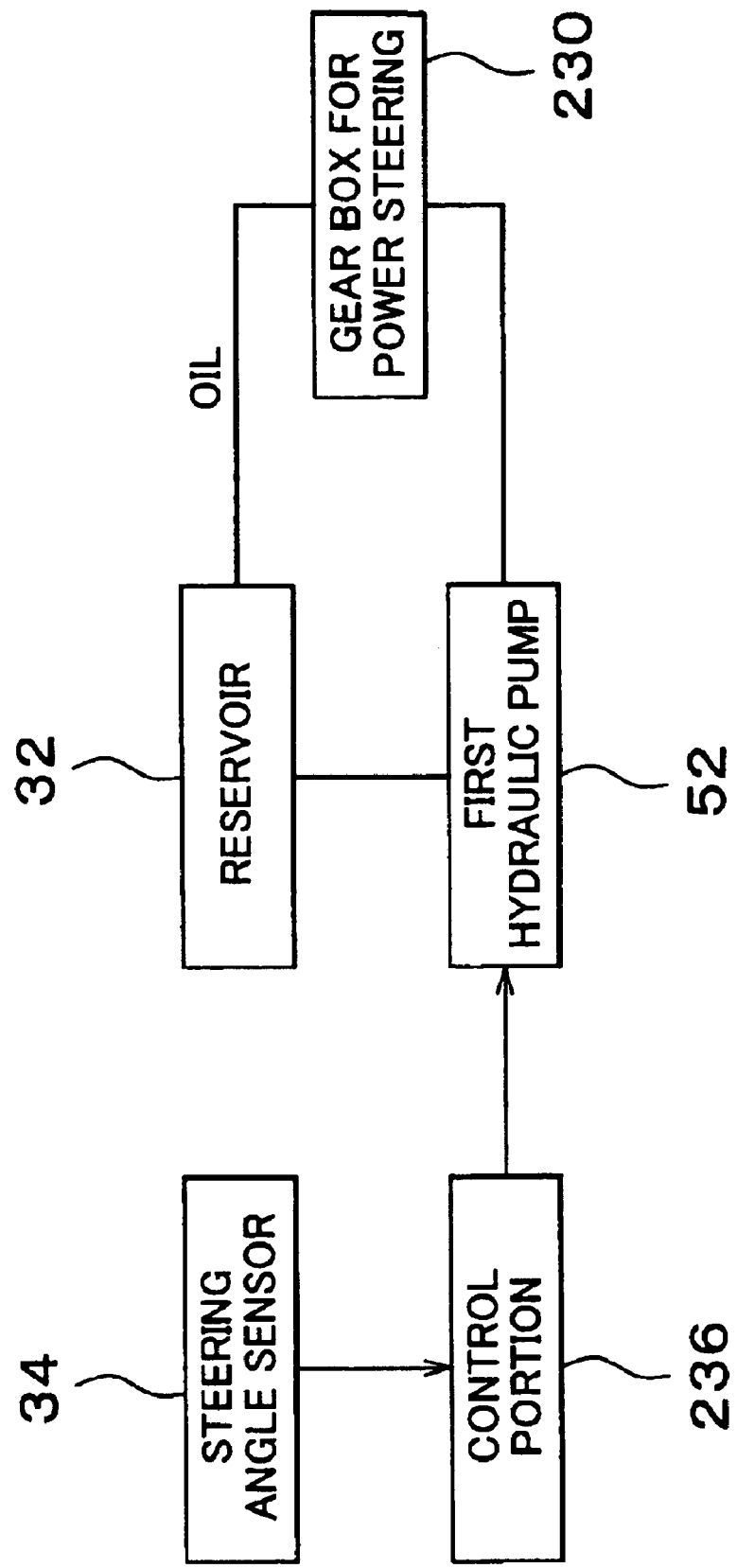
FIG. 12 is a view showing an oil circulating path of a hydraulic pump for a power steering.

For example, FIG. 12 is a view showing an oil circulating path of the hydraulic pump for the power steering. As shown in FIG. 12, the oil discharged from the first hydraulic pump 52 is supplied to a gear box 230 for the power steering, whereby the steering gear is driven. That is, when the steering is operated by the driver, this is detected by the steering angle sensor 34. Further, a control portion 236 controls the first hydraulic pump 52 on the basis of the detected value. In accordance with the control mentioned above, a steering gear within the power steering gear box 230 is controlled, and the steering operation corresponding to the steering operation of the driver is executed. In this case, an oil supplied from the power steering gear box 230 returns to a reservoir 32 and is stored here. The first hydraulic pump 52 sucks the oil from the reservoir 32 and discharges toward the power steering gear box 230. Further, a part of the discharge oil is returned to the first hydraulic pump 52, however, may be returned to the reservoir 32.

Figure 13:
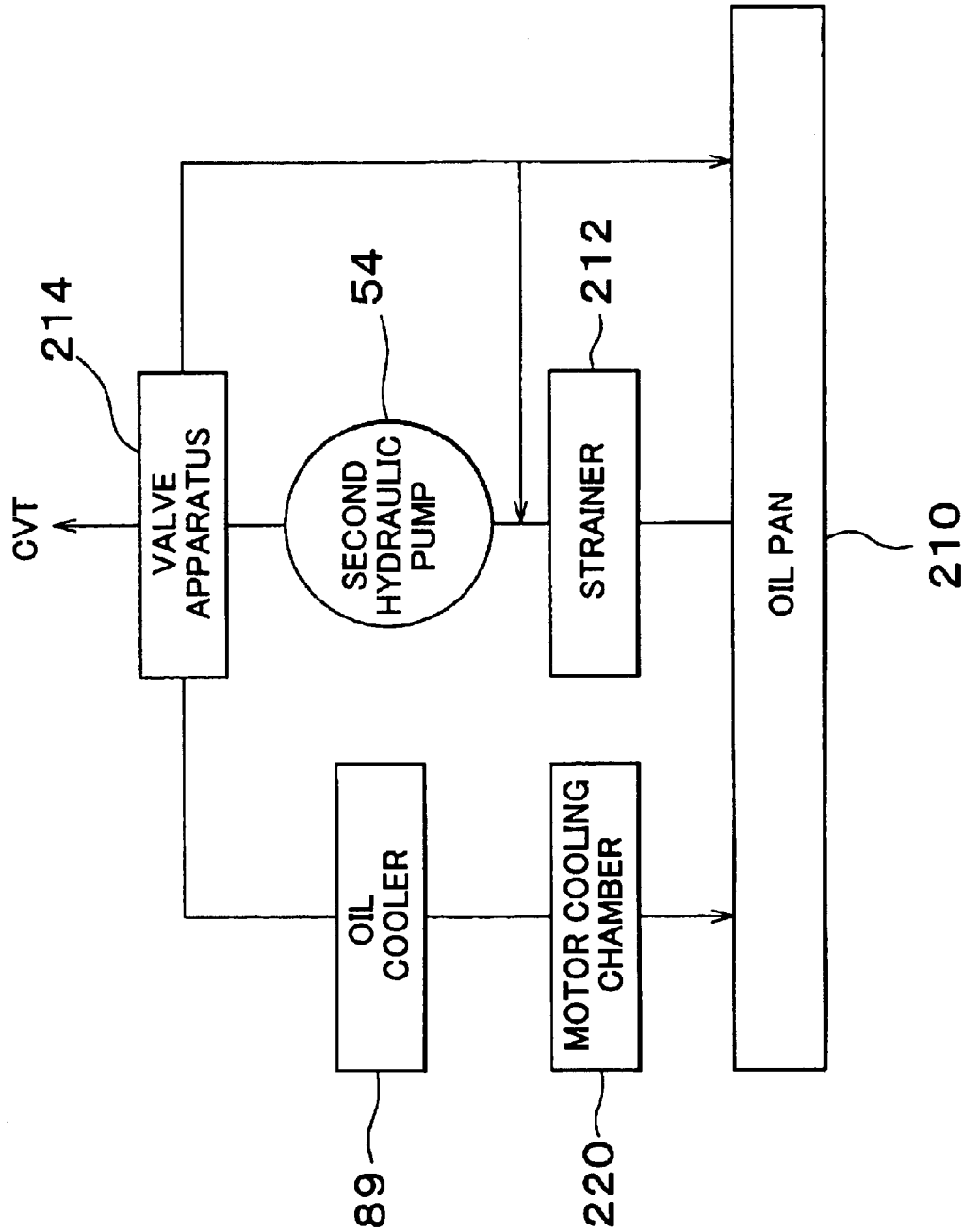
FIG. 13 is a view showing an oil circulating path of a hydraulic pump for a power train.

Further, on the basis of the rotation of the second rotor 66 within the housing 70 of the second hydraulic pump 54, a cam ring 74 rotates and the oil is discharged from the housing 70. In FIG. 13, the oil suction port and the discharge port are not clearly described, however, the second hydraulic pump 54 is structured such that an oil suction pipe and a discharge pipe are connected to the housing 70 so as to discharge the oil sucked from the oil suction pipe to the discharge pipe. In this case, the oil discharged from the power train pump 54 is structured such that a part thereof is returned to the suction side.

In this case, the circulating system of the oil by the second hydraulic pump 54 is structured as shown in FIG. 13. That is, the oil stored in an oil pan 210 is supplied to the second hydraulic pump 54 via a strainer 212. Further, the oil discharged from the second hydraulic pump 54 is supplied to a valve apparatus 214. The valve apparatus 214 is constituted by a plurality of valves so as to switch the flow path. Further, the oil is supplied to the mechanism for controlling the shift transmission ratio or the like in the continuously variable transmission (CVT) from the valve apparatus 214, however, a part thereof is returned to the oil pan 210 and the suction side of the second hydraulic pump 54.

Further, the valve apparatus 214 is also connected to the oil cooler 89, and is cooled here. Further, the cooled oil is returned to the oil pan 210 via a motor cooling chamber 220 (refer to FIG. 1). In this case, the motor cooling chamber 220 corresponds to a donut-like space formed between the housing 58 of the electric motor 50 and the outer periphery of the stator coil 56, and the oil cooled by the oil cooler 89 passes through the motor cooling chamber 220, whereby it is possible to cool the electric motor 50.

Figure 14:
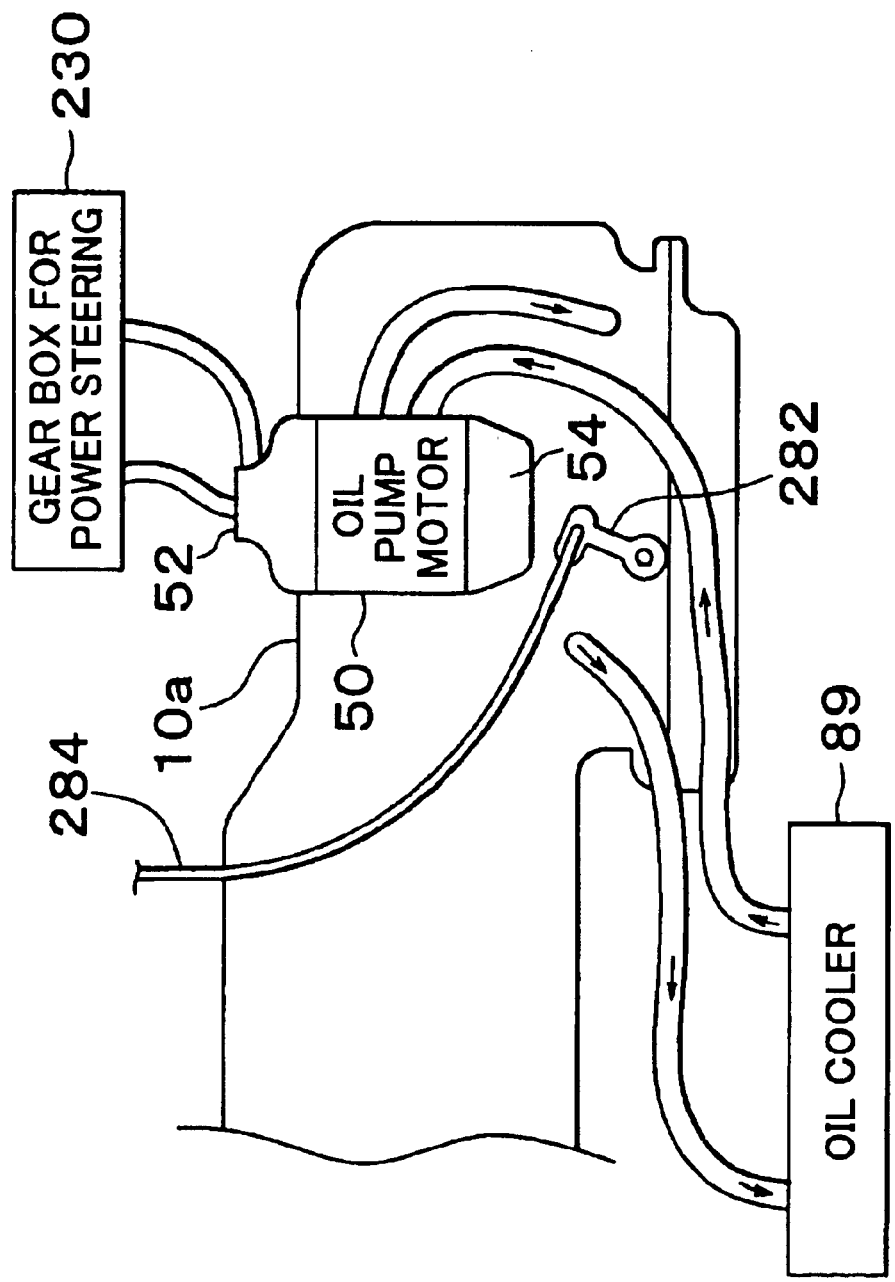
FIG. 14 is a view showing a mounting state of an electrically driven hydraulic pump.

FIG. 14 shows a structure in the case of mounting the hydraulic control apparatus 44 in accordance with the present embodiment to a power transmission apparatus 10a corresponding to a hybrid unit.

As illustrated, the hydraulic control apparatus 44 is mounted to the power transmission apparatus 10a in a state of setting the first hydraulic pump 52 upward and setting the second hydraulic pump 54 downward.

As mentioned above, the first hydraulic pump 52 is provided in an upper side of the electric motor 50, whereby it is possible to arrange a pipe extending through an upper portion of the power transmission apparatus 10a to the power steering gear box 230, and it becomes easy to arrange it.

Further, by arranging the second hydraulic pump 54 in the lower side of the electric motor 50, it is possible to directly suck and discharge the oil from a case of a hybrid unit 280, and no specific pipe is required. Further, since the suction and discharge position is set not to a bottom most position of the case of the hybrid unit 280 but to an intermediate position, it is possible to achieve a compact arrangement as a whole while avoiding an interference with an outer lever 282 and a shift cable 284 for controlling the shift transmission ratio which are provided in the bottom most portion.

Figure 15:
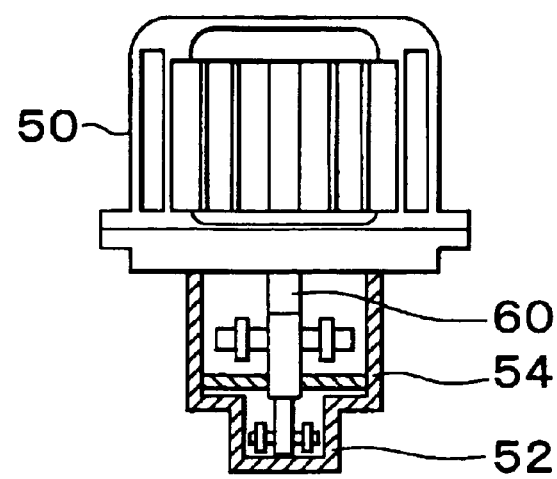
FIG. 15 is a view showing a structure of another electrically driven hydraulic pump.

FIG. 15 shows the structure of another embodiment. For example, in the electric pump in accordance with the embodiment mentioned above, the first rotor 64 and the second rotor 66 of the first hydraulic pump 52 and the second hydraulic pump 54 are respectively directly connected to both end portions of the shaft 60 in the electric motor 50. Accordingly, the rotational speed of the electric motor 50 is coincided with the rotational speed of the first hydraulic pump 52 and the second hydraulic pump 54.

In accordance with this embodiment, both of the first hydraulic pump 52 and the second hydraulic pump 54 are connected to the shaft 60 protruding to one direction from the electric motor 50.

In accordance with the structure mentioned above, it is possible to drive two pumps by utilizing one electric motor 50.

Further, a speed reduction or speed increasing gear mechanism may be interposed between the first rotor 64 of the first hydraulic pump 52 or the second rotor 66 of the second hydraulic pump 54 and the shaft 60 of the electric motor 50. In the case mentioned above, the rotary body directly connected to the shaft 60 is defined as a rotational speed of the first hydraulic pump 52 or the second hydraulic pump 54.

Figure 16:
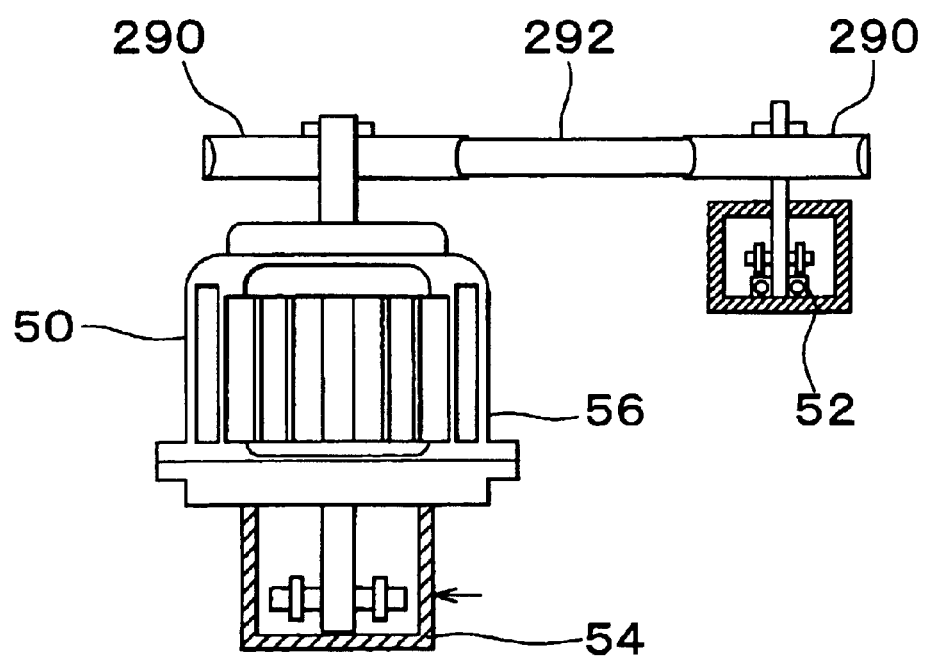
FIG. 16 is a view showing a structure of the other electrically driven hydraulic pump.

Further, in FIG. 16, the first hydraulic pump 52 is structured such as to be rotated by the electric motor 50 via both of a pulley 290 and a belt 292. In accordance with this structure, it is possible to drive the first hydraulic pump 52 and the second hydraulic pump 54 by utilizing one electric motor 50. In this case, the rotational force may be transmitted by a gear in place of the pulley 290 and the belt 292.

Further, in accordance with the present embodiment, the first hydraulic pump 52 and the second hydraulic pump 54 are the vane type pumps, however, may be the other type of hydraulic pump such as a centrifugal pump or the like.

Further, in the present embodiment, the hybrid vehicle provided with the engine 14 and the motor generator 16 as the drive source is employed. However, it is possible to apply to the normal vehicle in which the engine 14 is employed as the drive source and the driving force of the engine 14 is transmitted to the stepped type automatic transmission via the torque converter.

Further, the automatic transmission 12 mounted on the vehicle in accordance with the present embodiment is the belt type continuously variable transmission, however, it is possible to apply to an automatic transmission or the like for shifting in a stepped manner by selectively connecting the structural elements in plural sets of planetary gear apparatus.

In this case, the structure mentioned above corresponds to only one embodiment in accordance with the present invention, and the present invention can be variously modified within the range of the scope of the invention.

What is claimed is:

1. A hydraulic control apparatus of an automatic transmission for a vehicle comprising:

a first hydraulic pump for pressure feeding a working fluid for a power steering apparatus;

a second hydraulic pump for pressure feeding a working fluid for a shift transmission control of an automatic transmission;

a motor for driving the first hydraulic pump and the second hydraulic pump;

a power train target rotational speed determining portion which determines a target rotational speed for obtaining an amount of working fluid required in hydraulic control of the automatic transmission;

a power steering target rotational speed determining portion which determines a target rotational speed for obtaining an amount of working fluid reciuired in hydraulic control of the power steering apparatus;

a steering judging portion which determines whether or not a steering operation for turning the vehicle is being executed based on a steering angle and a steering angular speed of a steering wheel;

a target rotational speed selecting portion which selects, as the target rotational speed, a higher value among the target rotational speed determined by the power train target rotational speed determining portion and the target rotational speed determined by the power steering target rotational speed determining portion when the steering judging portion determines that the steering operation is being executed and selects the target rotational speed determined by the power train target rotational speed determining portion as the target rotational speed when the steering portion determines that the steering operation is not being executed; and an electric motor driving portion which drives the electric motor so that the target rotational speed selected by the target rotational speed selecting portion coincides with an actual rotational speed of the first hydraulic pump and the second hydraulic pump.

2. A hydraulic control apparatus of an automatic transmission for a vehicle according to claim 1, wherein the first hydraulic pump and the second hydraulic pump are respectively connected to both ends of a shaft of the motor.

3. A hydraulic control apparatus of an automatic transmission for a vehicle according to claim 1, wherein the first hydraulic pump and the second hydraulic pump are connected to one end of a shaft of the motor.

4. A hydraulic control apparatus of an automatic transmission for a vehicle according to claim 1, wherein a part of an oil circulating to the second hydraulic pump is circulated for cooling the motor.

5. A hydraulic control apparatus of an automatic transmission for a vehicle according to claim 1, wherein the automatic transmission is a continuously variable transmission, and the second hydraulic pump discharges a working fluid of the continuously variable transmission.

6. A hydraulic control apparatus of an automatic transmission for a vehicle according to claim 1, wherein the motor is an electric motor.

7. A hydraulic control apparatus of an automatic transmission for a vehicle according to claim 1, wherein the hydraulic control apparatus is provided with a shift transmission target rotational speed determining portion for determining a rotational speed of the second hydraulic pump for obtaining the amount of the working fluid required in the shift transmission control of the automatic transmission on the basis of at least one of an input torque of the automatic transmission, a working fluid temperature of the hydraulic control circuit for controlling the shift transmission of the automatic transmission, an operating position of the shift lever and a reduced speed of the vehicle.

8. A hydraulic control apparatus of an automatic transmission for a vehicle according to claim 1, wherein the hydraulic control apparatus is provided with a power steering target rotational speed determining portion for determining a rotational speed of the first hydraulic pump for obtaining the amount of the working fluid required in the power steering apparatus on the basis of at least one of a working fluid temperature of the hydraulic control circuit for controlling a steering force of the power steering apparatus, a steering angle and a steering angular speed.

9. A hydraulic control apparatus of an automatic transmission for a vehicle according to claim 1, wherein the automatic transmission is a belt type continuously variable transmission in which a transmission belt is wound around a pair of variable pulleys having variable effective diameters and the effective diameters of a pair of variable pulleys are changed by a hydraulic actuator, whereby a shift transmission ratio is continuously changed, and the hydraulic pump drive controlling portion determines a rotational speed of the second hydraulic pump for obtaining the amount of the working fluid required from the shift transmission control of the automatic transmission on the basis of the shift transmission ratio of the belt type continuously variable transmission.

10. A control method of a hydraulic control apparatus of an automatic transmission for a vehicle comprising:

determining a power train target rotational speed for obtaining an amount of working fluid required in hydraulic control of the automatic transmission;

determining a power steering target rotational speed for obtaining an amount of working fluid required in hydraulic control of the power steering apparatus;

determining whether or not a steering operation for turning the vehicle is being executed based on a steering angle and a steering angular speed of a steering wheel;

selecting as the target rotational speed, a higher value amount the power train target rotational speed and the power steering target rotational speed when it is determined that the steering operation is being executed;

selecting the power train target rotational speed as the target rotational speed when it is determined that the steering operation is not being executed; and driving the electric motor so that the selected target rotational speed coincides with an actual rotational speed of a first hydraulic pump and a second hydraulic pump.

11. A control method of a hydraulic control apparatus of an automatic transmission for a vehicle according to claim 10, determining a rotational speed of the first hydraulic pump for obtaining the amount of the working fluid required in the power steering apparatus on the basis of at least one of a working fluid temperature of the hydraulic control circuit for controlling a steering force of the power steering apparatus, a steering angle and a steering angular speed.

12. A control method of a hydraulic control apparatus of an automatic transmission for a vehicle according to claim 10, determining a rotational speed of the second hydraulic pump for obtaining the amount of the working fluid required in the shift transmission control of the automatic transmission on the basis of at least one of an input torque of the automatic transmission, a working fluid temperature of the hydraulic control circuit for controlling the shift transmission of the automatic transmission, an operating position of the shift lever and a reduced speed of the vehicle.

13. A hydraulic control method of an automatic transmission for a vehicle according to claim 10, wherein the motor is driven on the basis of the following formula:

$$I_{OPn}=I_{FF}+K_p (N_{OPM}-N_{OP})+k_D d(N_{OPM}-N_{OP})dt+k_D d (N_{OPM}-N_{OP})/dt$$

in which $I_{opn}$ is an amount of control operation of the motor, $I_{FF}$ is a feed forward amount determined in accordance with a battery voltage and a target rotational speed, $N_{OP}$ is an actual rotational speed of the first hydraulic pump and the second hydraulic pump, $N_{OPM}$ is a target rotational speed of the motor, $k_P$ is a proportional control constant, $k_1$ is an integral control constant and $k_D$ is a differential control constant.

14. A hydraulic control apparatus of an automatic transmission for a vehicle, comprising:

a first hydraulic pump for pressure feeding a working fluid for a power steering apparatus;

a second hydraulic pump for pressure feeding a working fluid for a shift transmission control of an automatic transmission are driven by a common electric motor; and a hydraulic pump drive controlling portion drives and controls the electric motor so as to have a higher rotational speed among a rotational speed of the first hydraulic pump for obtaining an amount of working fluid required in the power steering apparatus and a rotational speed of the second hydraulic pump for obtaining an amount of working fluid required in hydraulic control of the automatic transmission, comprising:

a power train steady target rotational speed determining portion which determines a power train steady target rotational speed for obtaining the amount of the working fluid required in the hydraulic control of the automatic transmission when the vehicle is in a steady state;

a power steering steady target rotational speed determining portion which determines a power steering steady target rotational speed for obtaining the amount of working fluid required in the hydraulic control of the power steering apparatus;

a target rotational speed selecting portion which selects the power train steady target rotational speed determined by the power train steady target rotational speed determining portion as the target rotational speed when the vehicle is in the steady state and a steering operation is not being executed, and selects, as the target rotational speed, a higher value among the power steering steady target rotational speed determined by the power steering steady target rotational speed determining portion and the power train steady target rotational speed determined by the power train steady target rotational speed determining portion when the vehicle is in the steady state and the steering operation is being executed; and an electric motor driving portion which drives the electric motor so that the target rotational speed selected by the target rotational speed selecting portion coincides with an actual rotational speed of the first hydraulic pump and the second hydraulic pump.

15. The hydraulic control apparatus of an automatic transmission for a vehicle according to claim 14, further comprising a power train transient target rotational speed determining portion which determines a power train transient target rotational speed for obtaining the amount of the working fluid required in the hydraulic control of the automatic transmission when the vehicle is in a transient state, wherein the power train transient target rotational speed determining portion determines a power train transient target rotational speed which is higher than the power train steady target rotational speed determined by the power train steady target rotational speed determining portion by a predetermined value, and which is obtained by adding a predetermined transient time compensating value to the power train steady target rotational speed at a kick down time, a manual shift transmission time, a sudden speed reduction time, a non-steering standby time, or a low working fluid temperature time.

16. The hydraulic control apparatus of an automatic transmission for a vehicle according to claim 14, further comprising:

a power steering transient target rotational speed determining portion which determines a power steering transient target rotational speed for obtaining the amount of the working fluid required in the hydraulic control of the power steering apparatus when the vehicle is in a transient state, wherein the power steering transient target rotational speed determining portion determines a power steering transient target rotational speed which is higher than the power steering steady target rotational speed determined by the power steering steady target rotational speed determining portion by a predetermined value, and which is obtained by adding a predetermined transient time compensating value to the power steering steady target rotational speed at a sudden steering time, a steering standby time or a low fluid temperature time.

17. A control method of a hydraulic control apparatus of an automatic transmission for a vehicle, which drives and controls an electric motor that simultaneously drives a first hydraulic pump and a second hydraulic pump so as to have a higher rotational speed among a rotational speed of the first hydraulic pump for obtaining an amount of working fluid required in a power steering apparatus and a rotational speed of the second hydraulic pump for obtaining an amount of working fluid required for a shift transmission control of the automatic transmission, comprising the steps of:

determining a power train steady target rotational speed for obtaining the amount of the working fluid required in hydraulic control of the automatic transmission when the vehicle is in a steady state;

determining a power steering steady target rotational speed for obtaining the amount of working fluid required in hydraulic control of-the power steering apparatus;

selecting the power train steady target rotational speed as the target rotational speed when the vehicle is in the steady state and a steering operation is not being executed;

and selecting, as the target rotational speed, a higher value among the power steering steady target rotational speed and the power train steady target rotational speed when the vehicle is in the steady state and the steering operation is being executed; and driving the electric motor so that the selected target rotational speed coincides with an actual rotational speed of the first hydraulic pump and the second hydraulic pump.

18. The control method of a hydraulic control apparatus of an automatic transmission for a vehicle according to claim 17, wherein a power train transient target rotational speed which is higher than the power train steady target rotational speed by a predetermined value is determined by adding a predetermined transient time compensating value to the power train steady target rotational speed at a kick down time, a manual shift transmission time, a sudden speed reduction time, a non-steering standby time, or a low working fluid temperature time.

19. The control method of a hydraulic control apparatus of an automatic transmission for a vehicle according to claim 17, wherein a power steering transient target rotational speed which is higher than the power steering steady target rotational speed by a predetermined value is determined by adding a predetermined transient time compensating value to the power steering steady target rotational speed at a sudden steering time, a steering standby time or a low fluid temperature time.

* * * * *